US010885600B2

United States Patent
Ide et al.

(10) Patent No.: US 10,885,600 B2
(45) Date of Patent: Jan. 5, 2021

(54) COMMUNICATION CONTROL APPARATUS, COMMUNICATION CONTROL APPARATUS METHOD, AND SYSTEM

(71) Applicant: FUJITSU LIMITED, Kawasaki (JP)

(72) Inventors: Masaru Ide, Setagaya (JP); Shinji Kanda, Fujisawa (JP); Toshikazu Kanaoka, Kawasaki (JP); Kaoru Kinoshita, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 16/171,231

(22) Filed: Oct. 25, 2018

(65) Prior Publication Data
US 2019/0066253 A1 Feb. 28, 2019

Related U.S. Application Data

(63) Continuation of application No. PCT/JP2016/063426, filed on Apr. 28, 2016.

(51) Int. Cl.
*G06Q 90/00* (2006.01)
*G06F 3/16* (2006.01)
(Continued)

(52) U.S. Cl.
CPC ............ *G06Q 90/20* (2013.01); *B25J 11/008* (2013.01); *B25J 13/003* (2013.01); *G06F 3/01* (2013.01);
(Continued)

(58) Field of Classification Search
CPC ....... G06Q 90/20; G06Q 50/10; B25J 11/003; B25J 11/008; G06F 3/01; G06F 3/16; G09F 25/00; G09F 2027/001; G09F 2027/002
(Continued)

(56) References Cited

U.S. PATENT DOCUMENTS

| 9,317,110 B2 * | 4/2016 | Lutnick | ................... G06F 3/011 |
| 2007/0150106 A1 * | 6/2007 | Hashimoto | ............ G06N 3/004 |
| | | | 700/245 |

(Continued)

FOREIGN PATENT DOCUMENTS

| JP | 2004-216513 | 8/2004 |
| JP | 2007-118129 | 5/2007 |

(Continued)

OTHER PUBLICATIONS

International Search Report and Written Opinion of the International Searching Authority, mailed in connection with PCT/JP2016/063426, dated Jun. 7, 2016 (10 pages), with partial English translation.

(Continued)

*Primary Examiner* — Quan-Zhen Wang
*Assistant Examiner* — Mancil Littlejohn, Jr.
(74) *Attorney, Agent, or Firm* — Fujitsu Patent Center

(57) ABSTRACT

A communication control apparatus, including a memory, and a processor coupled to the memory and the processor configured to execute a process, the process including selecting one or more users from users based on intensities of received signals of sensor information transmitted by a plurality of tag devices associated with the users respectively, outputting information that instructs an operation for the plurality of tag devices, detecting the tag device for which the operation has been performed based on acceleration information of the plurality of tag devices, and causing a service provision device to output sound information regarding a service for a specific user associated with the detected tag device.

13 Claims, 19 Drawing Sheets

(51) Int. Cl.
*G09F 25/00* (2006.01)
*G06Q 50/10* (2012.01)
*G06F 3/01* (2006.01)
*B25J 11/00* (2006.01)
*B25J 13/00* (2006.01)

(52) U.S. Cl.
CPC .............. *G06F 3/16* (2013.01); *G06Q 50/10* (2013.01); *G09F 25/00* (2013.01)

(58) Field of Classification Search
USPC ...................................................... 340/691.6
See application file for complete search history.

(56) References Cited

U.S. PATENT DOCUMENTS

| | | | | |
|---|---|---|---|---|
| 2007/0279277 | A1* | 12/2007 | Kuramoto | H01Q 3/04 342/147 |
| 2008/0246610 | A1* | 10/2008 | Packert | H04B 5/0062 340/572.1 |
| 2010/0156651 | A1* | 6/2010 | Broer | G01S 13/74 340/670 |
| 2013/0229342 | A1 | 9/2013 | Hiyama et al. | |
| 2015/0065046 | A1* | 3/2015 | Wilfred | H04W 76/14 455/41.2 |
| 2015/0154427 | A1* | 6/2015 | Barnes | G06K 19/0723 340/10.5 |
| 2015/0248704 | A1 | 9/2015 | Fujiwara et al. | |
| 2016/0078791 | A1* | 3/2016 | Helms | G09F 27/00 348/565 |
| 2017/0236330 | A1* | 8/2017 | Seif | G06T 19/006 345/633 |

FOREIGN PATENT DOCUMENTS

| | | |
|---|---|---|
| JP | 2008-055578 | 3/2008 |
| JP | 2008-260107 | 10/2008 |
| JP | 2009-248193 | 10/2009 |
| JP | 2014-157262 | 8/2014 |
| JP | 2015-103037 | 6/2015 |
| JP | 2015-162162 | 9/2015 |
| WO | 2012/063561 | 5/2012 |

OTHER PUBLICATIONS

Alexandra Instituttet A/S, "Audio beacon concept for the blind", May 20, 2015, p. 1, XP054979187, Retrieved from the Internet: URL:https://www.youtube.com/watch?v=2x--RMjW9Gs [retrieved on Mar. 5, 2019] Cited in Extended European Search Report (EESR) dated Mar. 14, 2019 for corresponding European Patent Application No. 16900484.3.

David Glance, "A beacon to the future. How Apple has enabled Minority Report shopping", Jul. 31, 2014, XP055564414. Retrieved from the Internet: URL:https://theconversation.com/a-beacon-to-the-future-howapple-has-enabled-minority-report-shopping-30003 [retrieved on Mar. 4, 2019] Cited in Extended European Search Report (EESR) dated Mar. 14, 2019 for corresponding European Patent.

EESR—Extended European Search Report (EESR) of European Patent Application No. 16900484.3 dated Mar. 14, 2019.

EPOA—Office Action of European Patent Application No. 16900484.3 dated Apr. 1, 2020.

* cited by examiner

FIG. 12

| | USER INFORMATION | | SENSOR INFORMATION | | |
|---|---|---|---|---|---|
| | USER ID | NAME | BEACON ID | ACCELERATION INFORMATION | GEOMAGNETIC INFORMATION |
| No.1 | {"01234567":{<USER INFORMATION>}} | {"kana":"Tanaka"} | {"001122334455":{<BEACON INFORMATION>}} | {"0":{<ACCELERATION INFORMATION>}} | {"0":{<GEOMAGNETIC INFORMATION>}} |
| No.2 | {"01234568":{<USER INFORMATION>}} | {"kana":"Takagi"} | {"001122334456":{<BEACON INFORMATION>}} | {"1":{<ACCELERATION INFORMATION>}} | {"0":{<GEOMAGNETIC INFORMATION>}} |
| No.3 | ... | ... | ... | ... | ... |
| No.4 | ... | ... | ... | ... | ... |
| No.5 | ... | ... | ... | ... | ... |
| No.6 | ... | ... | ... | ... | ... |

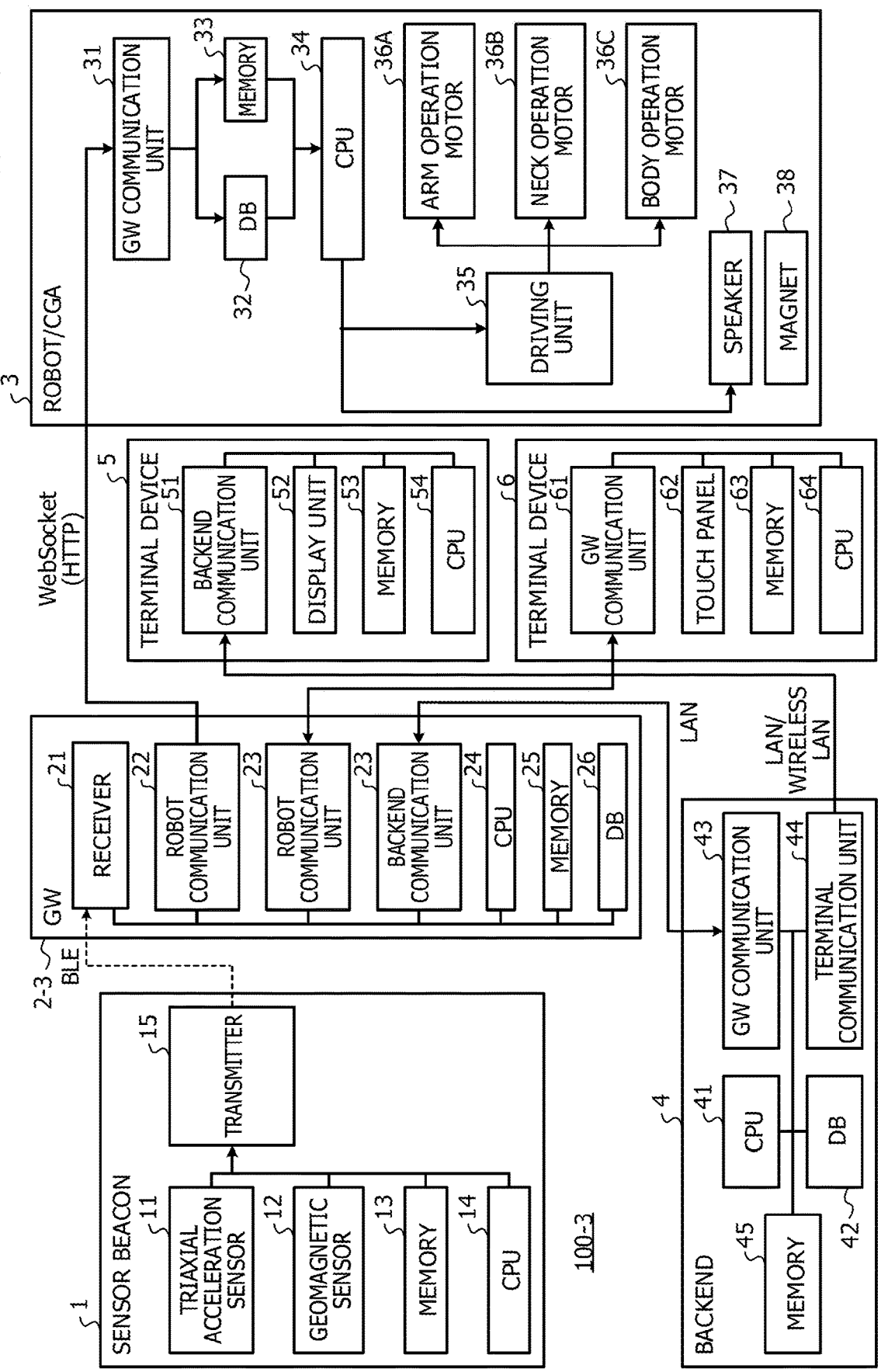

COMMUNICATION CONTROL APPARATUS, COMMUNICATION CONTROL APPARATUS METHOD, AND SYSTEM

CROSS-REFERENCE TO RELATED APPLICATION

This application is a continuation application of International Application PCT/JP2016/063426 filed on Apr. 28, 2016 and designated the U.S., the entire contents of which are incorporated herein by reference.

FIELD

The embodiments discussed herein are related to a communication control apparatus, a communication control method, and a system.

BACKGROUND

In recent years, in exhibition halls and the like, a service providing unit such as a robot or a computer graphics agent (CGA) may provide a service such as an explanation of an exhibition to a visitor who is an example of a user. However, for example, even if the service providing unit whose position is fixed explains, visitors who are interested in explanation content are not necessarily near the service provision unit. On the other hand, even if specific visitors interested in the explanation content are near the service provision unit, it is difficult for the service providing unit to recognize the specific visitors from among a large number of visitors. However, for example, if the service providing unit vaguely provided services such as an audio guide to a large number of visitors, it is difficult to efficiently provide the services to specific visitors whose positions are unknown.

If the faces, audios, and the like of the specific visitors interested in the explanation content of the service providing unit are previously registered, it is possible to search for specific visitors out of a large number of visitors by recognizing the faces, audios, and the like by the service providing unit. However, as the number of specific visitors increases, the load of registration work of faces and audios increases, and the amount of information to be registered also increases, which is not a practical method.

For this reason, a method for efficiently providing a service provided by a service providing unit to a user who wants to receive the service is desired.

Japanese Laid-open Patent Publication No. 2008-55578, Japanese Laid-open Patent Publication No. 2008-260107, Japanese Laid-open Patent Publication No. 2014-157262, Japanese Laid-open Patent Publication No. 2015-162162, and Japanese Laid-open Patent Publication No. 2015-103037 are examples of the related art.

In the method of the related art, it is difficult to efficiently provide a service provided by a service providing unit to a user who wants to receive the service.

In view of the above, it is an object of an aspect of the embodiment to provide a communication control apparatus, method, and system that may efficiently provide a service provided by a service providing unit to a user who wants to receive the service.

According to the aspect, it is possible to efficiently provide the service provided by the service providing unit to the user who wants to receive the service.

SUMMARY

According to an aspect of the embodiments, a communication control apparatus, including a memory, and a processor coupled to the memory and the processor configured to execute a process, the process including selecting one or more users from users based on intensities of received signals of sensor information transmitted by a plurality of tag devices associated with the users respectively, outputting information that instructs an operation for the plurality of tag devices, detecting the tag device for which the operation has been performed based on acceleration information of the plurality of tag devices, and causing a service provision device to output sound information regarding a service for a specific user associated with the detected tag device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram for describing an example of a data-base;

FIG. 16 is a block diagram illustrating an example of a hardware configuration of a system in a third example;

DESCRIPTION OF EMBODIMENTS

In the disclosed communication control apparatus, method, and system, by a first narrowing-down, a plurality of users are narrowed down to users of which intensities of received radio waves of pieces of sensor information transmitted by tags of the plurality of users are equal to or greater than a threshold value, by a first control, a service providing unit is controlled so as to perform a first audio output for instructing operations of the tags on the users narrowed down by the first narrowing-down unit, by a second narrowing-down, the users are narrowed down to one user in which a specific change in acceleration information of the tag included in the pieces of sensor information occurs first, after the first audio output, and by a second control, the service providing unit is controlled so as to provide a service by a second audio output to the one user.

Each example of the disclosed communication control apparatus, method, and system will be described below with reference to drawings.

EXAMPLES

First Example

Figure 1:
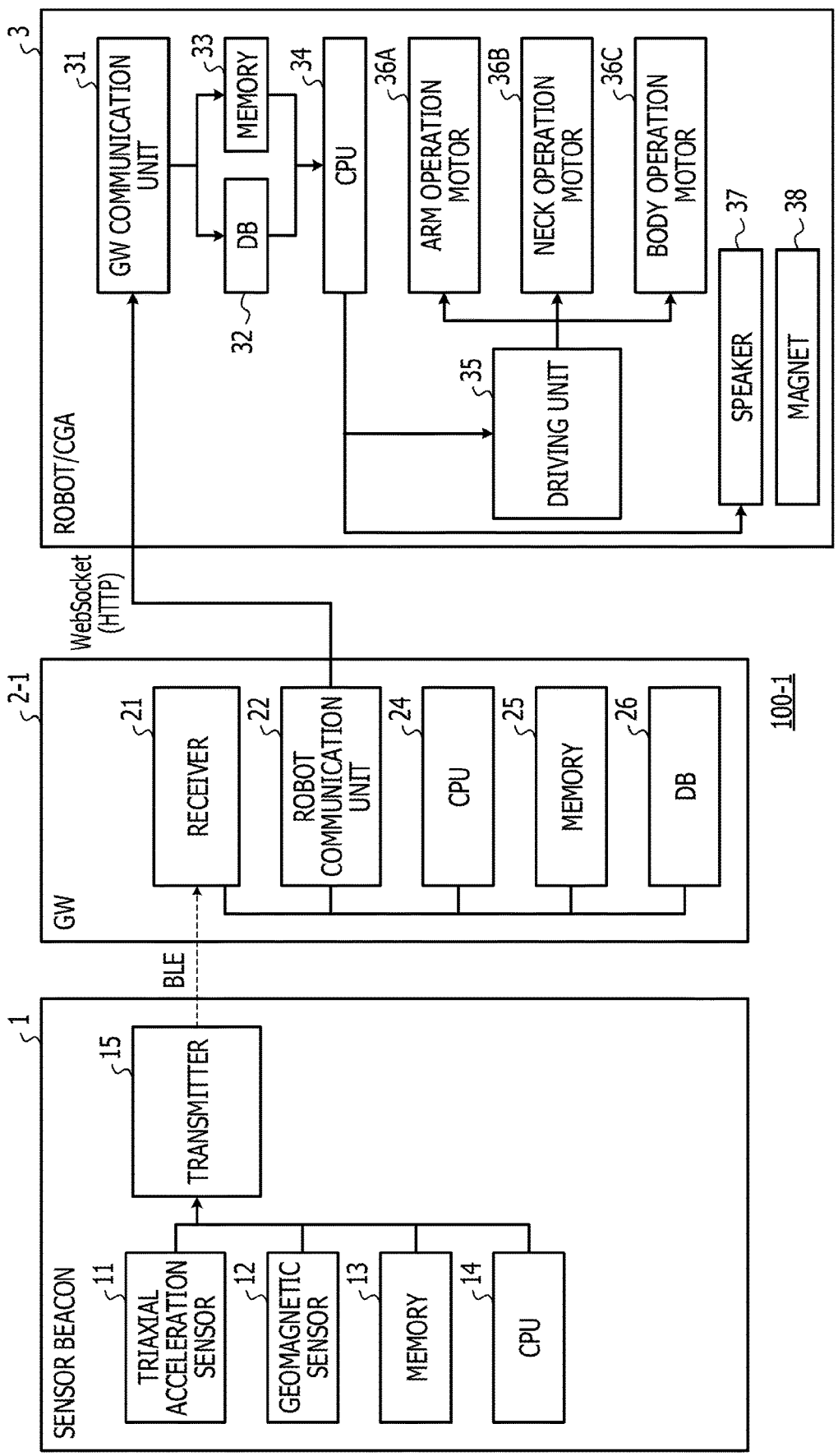
FIG. 1 is a block diagram illustrating an example of a hardware configuration of a system in a first example.

FIG. 1 is a block diagram illustrating an example of a hardware configuration of a system in a first example. A system 100-1 illustrated in FIG. 1 includes a sensor beacon 1, a gateway (GW: Gate-Way) 2-1, and a robot or CGA (hereinafter, also referred to as "robot/CGA") 3. Since this system 100-1 is applied to, for example, an exhibition hall, the GW 2-1 and the robot/CGA 3 are provided in the exhibition hall and may be provided at the same position. The robot/CGA 3 is provided in, for example, one exhibition booth in the exhibition hall. The sensor beacon 1 is carried by visitors who visit in the exhibition hall. For example, the sensor beacon 1 may be housed in a neck-holding card holder which a visitor may hang from the neck. The visitor is an example of a user who receives a service.

The sensor beacon 1 is an example of an active tag. The sensor beacon 1 includes a triaxial acceleration sensor 11, a geomagnetic sensor 12, a memory 13, a central processing unit (CPU) 14, and a transmitter 15. The CPU 14 is an example of a processor that controls the overall operation of the sensor beacon 1. The pieces of sensor information transmitted by the transmitter 15 of the sensor beacon 1 under the control of the CPU 14 includes acceleration information, geomagnetic information, and beacon ID. The transmitter 15 communicates with the GW 2-1 in compliance with, for example, Bluetooth Low Energy (registered trademark) (BLE). The acceleration information represents the acceleration detected by the triaxial acceleration sensor 11. The geomagnetic information represents the geomagnetism detected by the geomagnetic sensor 12. The beacon ID is stored in the memory 13 and is an example of identification information for identifying each sensor beacon 1. The memory 13 may store programs executed by the CPU 14 and the like.

The GW 2-1 is an example of a communication control apparatus that may receive pieces of sensor information transmitted by the sensor beacon 1 and may communicate with the robot/CGA 3. The GW 2-1 includes a receiver 21, a robot communication unit 22, a CPU 24, a memory 25, and a data-base (DB) 26. The CPU 24 is an example of a processor that controls the overall operation of the GW 2-1. The receiver 21 receives pieces of the sensor information transmitted from the sensor beacon 1 under the control of the CPU 24 and detects an intensity of the received radio wave (that is, the intensity of received signal) in addition to the acceleration information, the geomagnetic information, and the beacon ID. The robot communication unit 22 communicates with the robot/CGA 3 under the control of the CPU 24, for example, in compliance with WebSocket (HTTP, registered trademark). The memory 25 may store programs executed by the CPU 24 and the like. In this example, in the individual sensor beacons 1, for example, the name of the visitor is registered when the visitor is registered at the reception of the exhibition hall. Therefore, in the DB 26, the user ID for specifying a visitor is registered in association with the beacon ID of the sensor beacon 1 together with the name of the visitor. The user ID is an example of identification information for identifying individual users. The CPU 24 calculates the angle (or attitude) of the sensor beacon 1 based on the acceleration information from the sensor beacon 1 and determines whether magnetism of the magnet 38 of the robot/CGA 3 is detected or not based on the geomagnetic information from the sensor beacon 1.

The robot/CGA 3 is an example of a service providing unit. The robot/CGA 3 includes a GW communication unit 31, a DB 32, a memory 33, a CPU 34, a driving unit 35, an arm operation motor 36A, a neck operation motor 36B, a body operation motor 36C, a speaker 37, and a magnet 38.

The GW communication unit 31 communicates with the GW 2. The DB 32 stores patterns of various audio outputs, various operation patterns of the robot/CGA 3, and the like. The memory 33 stores programs, parameters, and the like for allowing the robot/CGA 3 to perform various operations and to output various audios. The CPU 34 is an example of a processor that controls the operation of the entire robot/CGA 3.

Under the control of the CPU 34, the driving unit 35 drives the motors 36A, 36B, and 36C according to the operation patterns stored in the DB 32. The arm operation motor 36A includes, for example, two motors that operate the two arms of the robot/CGA 3. The neck operation motor 36B includes a motor that operates (for example, panning and tilting) the neck of the robot/CGA 3. The body operation motor 36C includes a motor that operates (for example, panning and tilting) the torso of the robot/CGA 3.

Under the control of the CPU 34, the speaker 37 outputs an audio in accordance with the pattern of the audio output stored in the DB 32. The audio output includes an audio guide, an audio instruction, an audio response, and the like. The magnet 38 is provided at a specific position of the robot/CGA 3. When the sensor beacon 1 approaches a specific position of the robot/CGA 3, for example, or contacts with the magnet 38 at a specific position, the geomagnetic sensor 12 of the sensor beacon 1 detects the magnetism of the magnet 38. In this way, from the geomagnetic information included in the pieces of the sensor information transmitted from the sensor beacon 1, it is possible to know that this sensor beacon 1 approaches a specific position of the robot/CGA 3 or is in contact with the magnet 38 at a specific position.

Figure 2:
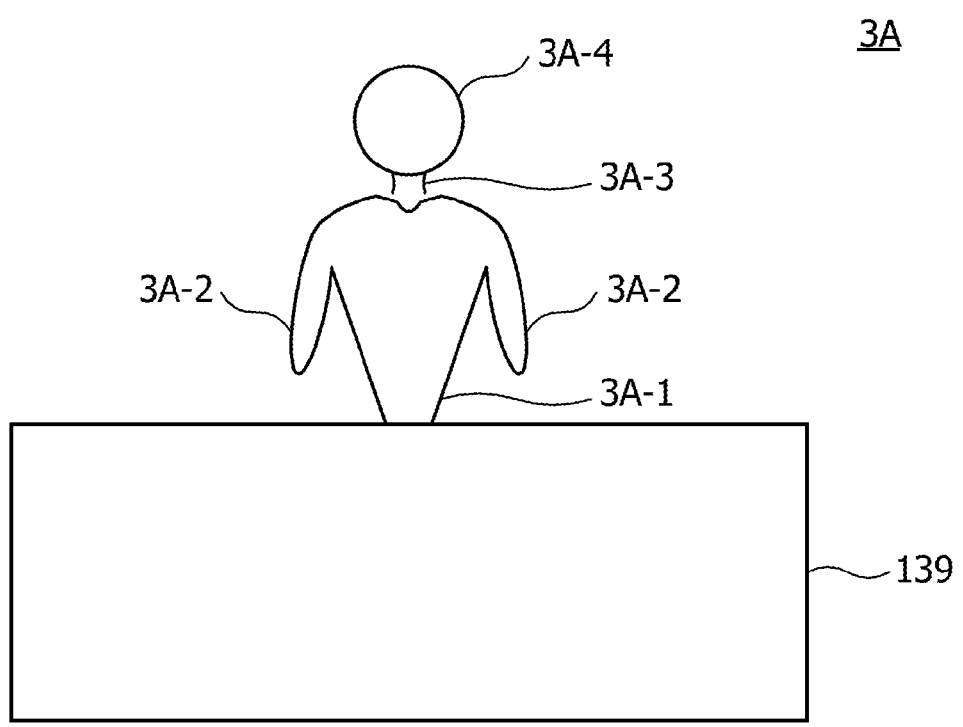
FIG. 2 is a front view illustrating an example of a robot.

FIG. 2 is a front view illustrating an example of a robot. The robot 3A illustrated in FIG. 2 is an example of the robot/CGA 3. The robot 3A has a body 3A-1, two arms 3A-2, a neck 3A-3, and a head 3A-4. In this example, the body 3A-1 is provided on a support base 139. At least one of the speaker 37 and the magnet 38 may be provided on the side of the robot 3A or on the side of the support base 139. That is, the support base 139 may form part of the robot 3A. In addition, the magnet 38 may be provided on one arm 3A-2.

Figure 3:
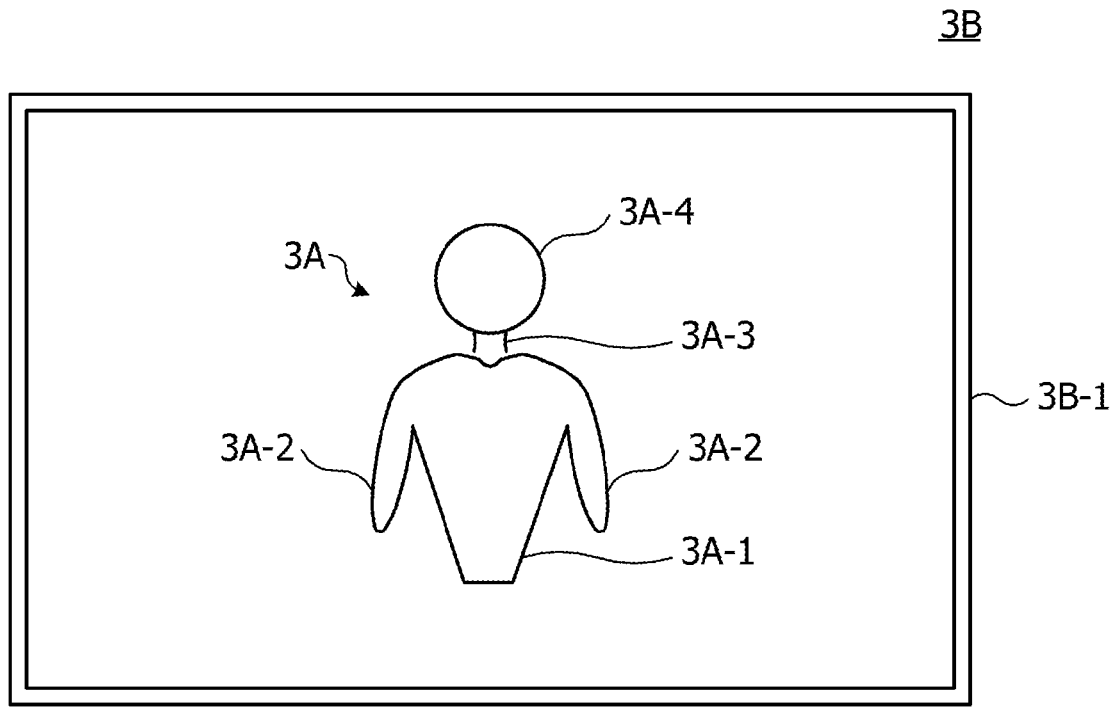
FIG. 3 is a front view illustrating an example of a CGA.

FIG. 3 is a front view illustrating an example of a CGA. The CGA 3B illustrated in FIG. 3 is an example of the robot/CGA 3. The CGA 3B includes a display device 3B-1 that displays an image of the robot 3A having the body 3A-1, the two arms 3A-2, the neck 3A-3, and the head 3A-4. In the case of the CGA 3B, the driving unit 35 and the motors 36A, 36B, and 36C may be program modules stored in the memory 33 and executed by the CPU 34. The CPU 34 of the CGA 3B executes the program modules, thereby causing the robot 3A displayed on the display device 3B-1 to perform the same operation as controlling the driving unit 35 and the motors 36A, 36B, and 36C of the robot 3A illustrated in FIG. 2. The speaker 37 and the magnet 38 are provided in the display device 3B-1.

Figure 4:
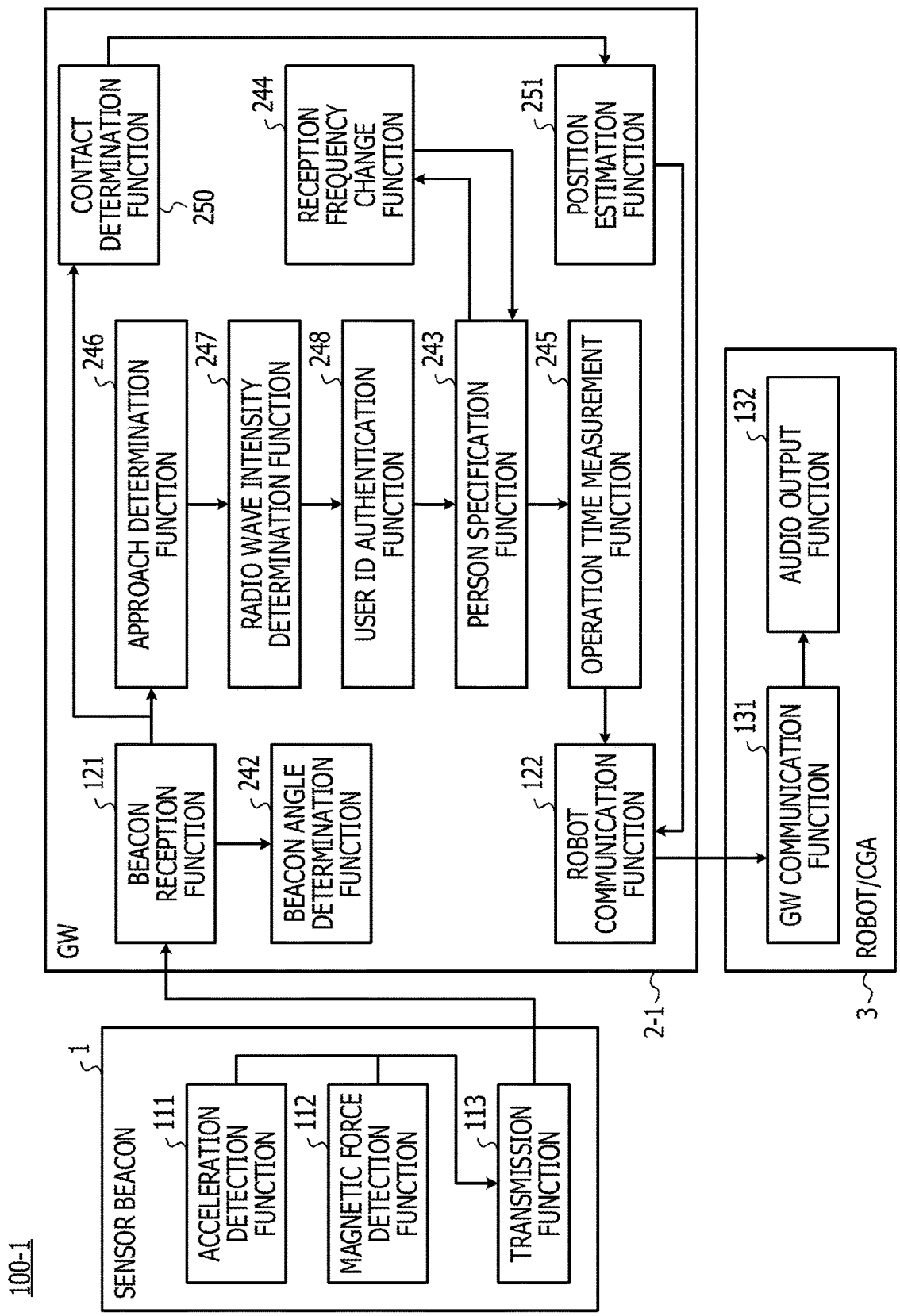
FIG. 4 is a functional block diagram illustrating an example of a functional configuration of the system in the first example.

FIG. 4 is a functional view illustrating an example of a functional configuration of the system in the first example. In the system 100-1 illustrated in FIG. 1, the sensor beacon 1 has an acceleration detection function 111, a magnetic force detection function 112, and a transmission function 113. The acceleration detection function 111 is a function of the CPU 14 that acquires acceleration information representing the acceleration detected by the triaxial acceleration sensor 11. The magnetic force detection function 112 is a function of the CPU 14 that acquires geomagnetic information representing the geomagnetism detected by the geomagnetic sensor 12. The transmission function 113 is a function of the CPU 14 that transmits the pieces of the sensor information including the acceleration information, the geomagnetic information, and the beacon ID read from the memory 13 from the transmitter 15 to the GW 2.

The GW 2-1 has a beacon reception function 121, a robot communication function 122, a beacon angle determination function 242, a person specification function 243, a reception frequency change function 244, an operation time measurement function 245, an approach determination function 246, a radio wave intensity determination function 247, a user ID authentication function 248, a contact determination function 250, and a position estimation function 251.

The beacon reception function 121 is a function of the CPU 24 that detects pieces of sensor information from the sensor beacon 1 received by the receiver 21. The robot communication function 122 is a function of the CPU 24 that communicates with the robot/CGA 3 via the robot communication unit 22.

When the intensity of the received radio wave (for example, intensity of received signal) of the pieces of the sensor information from the sensor beacon 1 received by the receiver 21 is equal to or greater than a threshold value Th, the approach determination function 246 is a function of the CPU 24 that determines that a visitor carrying the sensor beacon 1 approaches a distance of, for example, 3 m or less from the robot/CGA 3 by referring to the DB 26. The radio wave intensity determination function 247 is a function of the CPU 24 that determines the top N1 (for example, 5) sensor beacons 1 having the highest intensities of the received radio waves among the sensor beacons 1 transmitting the pieces of the sensor information of which the intensities of the received radio waves are equal to or greater than the threshold value Th. The radio wave intensity determination function 247 may specify N1 visitors (for example, 5 people) who has approached the robot/CGA 3 most. By referring to the DB 26, the user ID authentication function 248 is a function of the CPU 24 that authenticates the user IDs of the top N1 sensor beacons 1 of which the intensities of the received radio waves of the transmitting pieces of sensor information are equal to or greater than the threshold value Th.

The beacon angle determination function 242 is a function of the CPU 24 that determines the angle (or attitude) of the sensor beacon 1 based on the acceleration information among the pieces of the sensor information from the sensor beacon 1 received by the receiver 21. The person specification function 243 is a function of the CPU 24 that specifies N2 (N2 N1) visitors who have operated (for example, flipped over or shaken) the sensor beacon 1 by referring to the DB 26 based on the acceleration information and the beacon ID among the pieces of the sensor information from the sensor beacon 1 received by the receiver 21. For example, the person specification function 243 may specify the N2 visitors (for example, 3 people) who want to receive an explanation of the robot/CGA 3. The reception frequency change function 244 is a function of the CPU 24 that changes the direction in which the receiver 21 increases the frequency of receiving the pieces of the sensor information from the sensor beacon 1. The operation time measurement function 245 is a function of the CPU 24 that measures the operation time of one visitor who has operated the sensor beacon 1 the earliest among the visitors who have operated the sensor beacon 1.

The contact determination function 250 is a function of the CPU 24 that determines whether or not the sensor beacon 1 is in contact with the magnet 38 of the robot/CGA 3 (or whether or not the sensor beacon 1 is substantially in contact with the magnet) based on the geomagnetic information among the pieces of the pieces of the sensor information from the sensor beacon 1 received by the receiver 21. The position estimation function 251 is a function of the CPU 24 that determines that one visitor carrying the sensor beacon 1 is at the guide position in a vicinity of the robot/CGA 3 corresponding to the position of the magnet 38 of the robot/CGA 3 by referring to the DB 26 when the contact determination function 150 determines the sensor beacon 1 is in contact with the magnet 38 of the robot/CGA 3.

The robot/CGA 3 has a GW communication function 131 and an audio output function 132. The GW communication function 131 is a function of the CPU 34 that communicates with the GW 2-1 via the GW communication unit 31. The audio output function 132 is a function of the CPU 34 that performs various audio outputs from the speaker 37 by referring to the DB 32.

Figure 5:
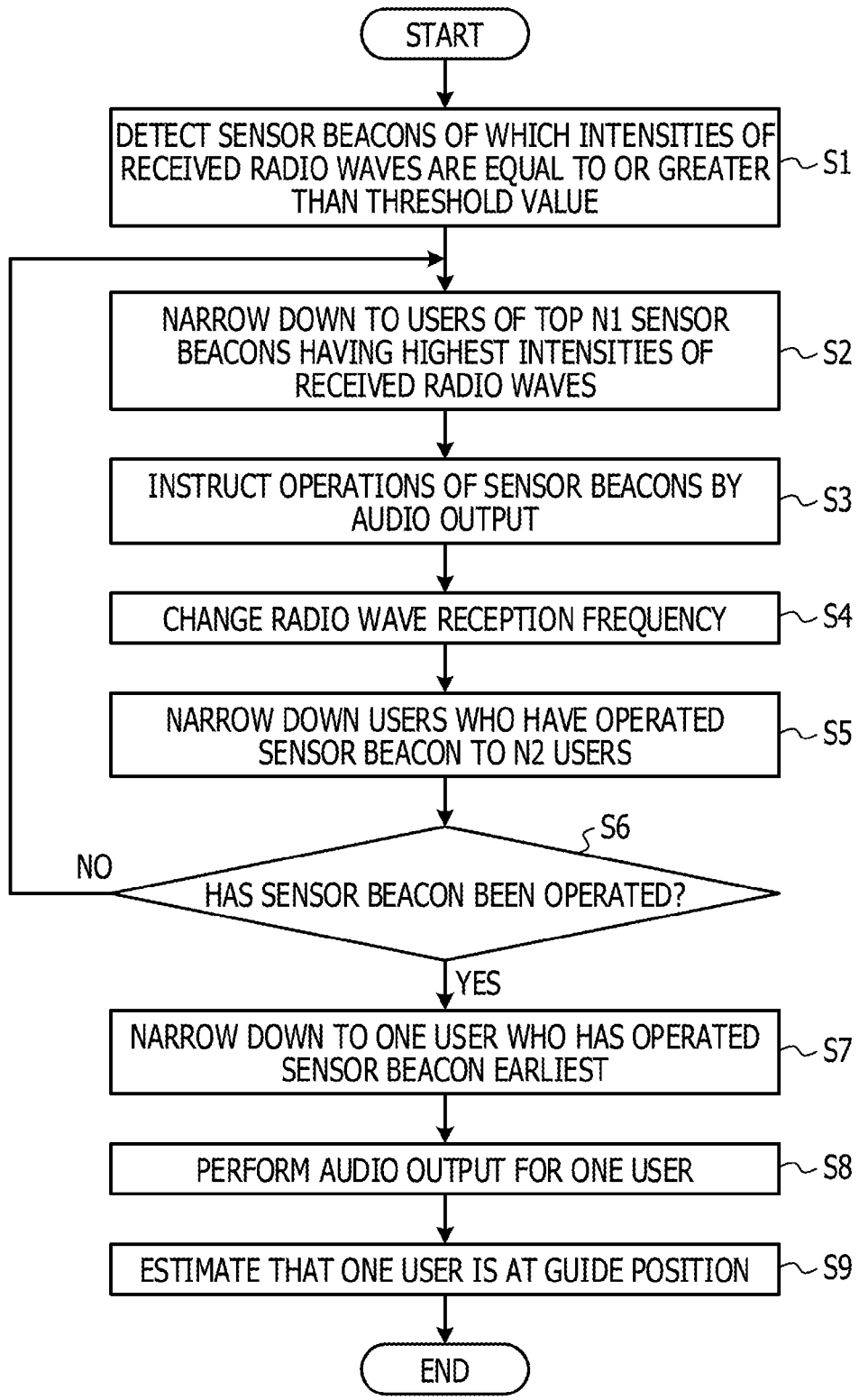
FIG. 5 is a flowchart for describing an example of a process of the system in the first example.
Figure 6:
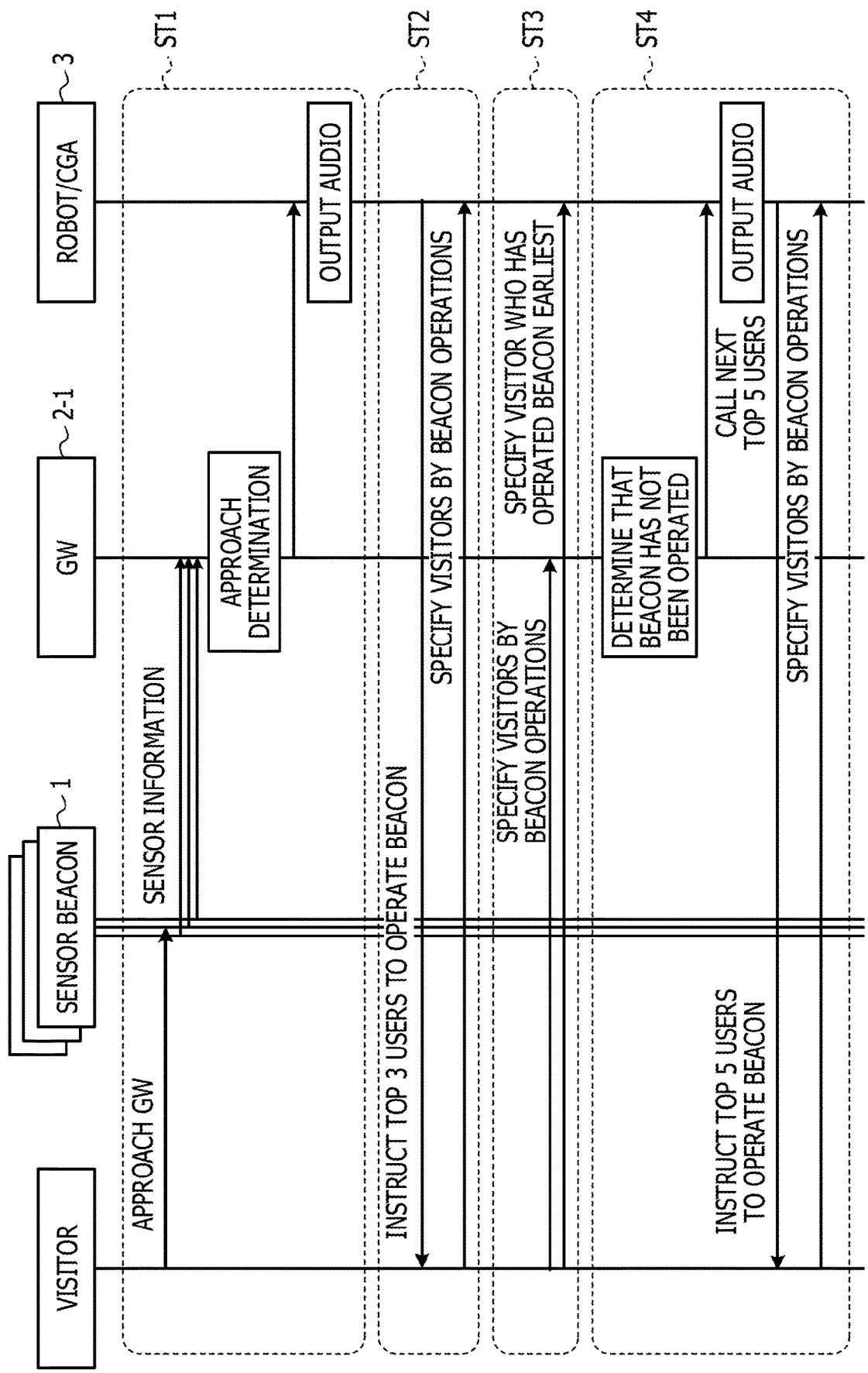
FIG. 6 is a sequence diagram for describing an example of the process of the system in the first example.
Figure 7:
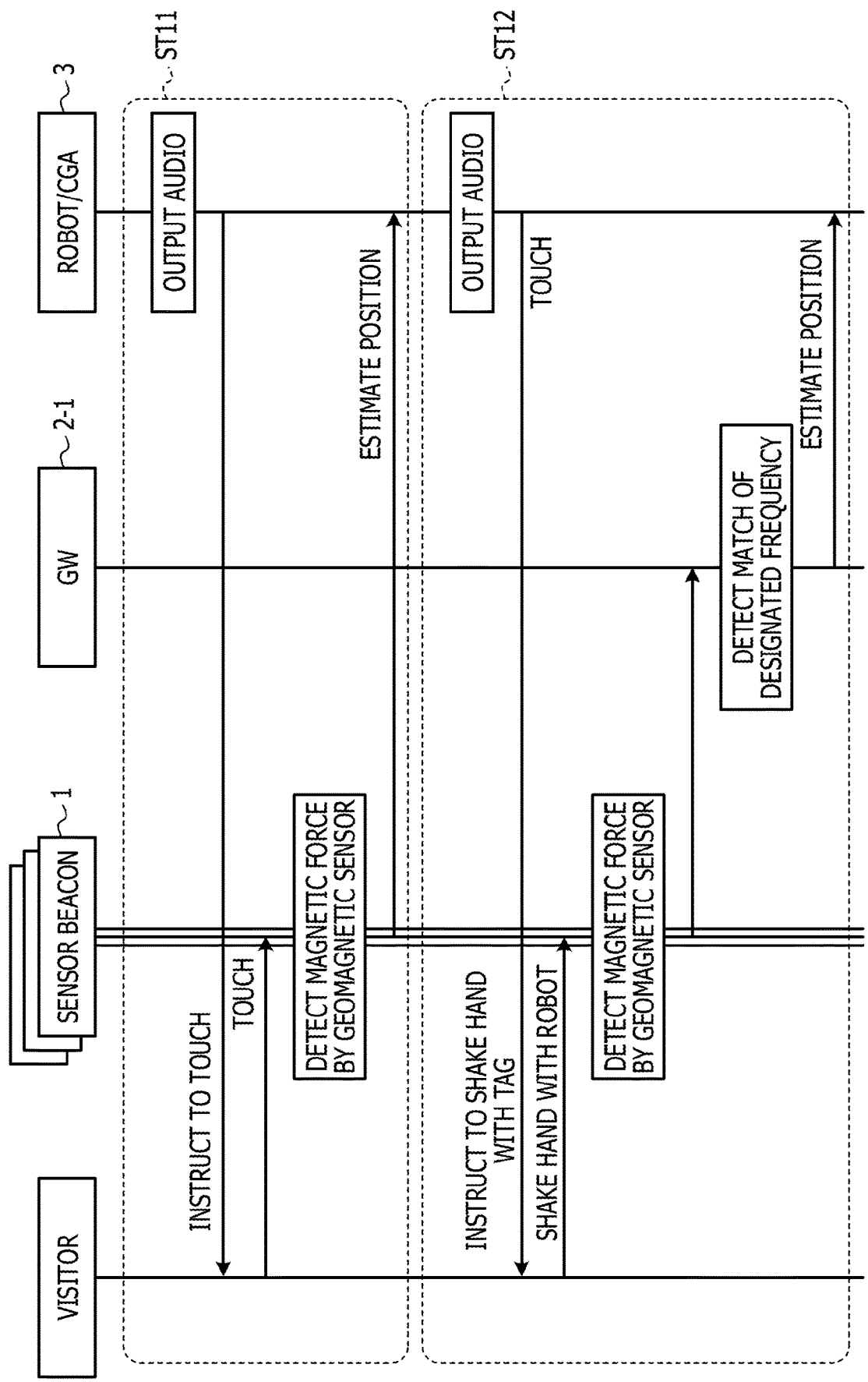
FIG. 7 is a sequence diagram for describing an example of the process of the system in the first example.

FIG. 5 is a flowchart for describing an example of the process of the system in the first example. In addition, FIGS. 6 and 7 are sequence diagrams for describing examples of the process of the system in the first example.

In FIG. 5, in step S1, the CPU 24 of the GW2-1 detects the sensor beacon 1 within a range where it is likely to respond to the audio output from the robot/CGA 3, for example, the distance from the robot/CGA 3 is a radius of 3 m or less. Among the plurality of sensor beacons 1, the intensity of the received radio wave (that is, the intensity of received signal) from the sensor beacon 1 whose distance from the robot/CGA 3 is, for example, a radius of 3 m or less, is equal to or greater than the threshold value Th. Therefore, if the intensity of the received radio wave received from the sensor beacon 1 received at the first radio wave reception frequency Fr1 is equal to or greater than the threshold value Th, it may be determined that the sensor beacon 1 is located at a distance of 3 m or less from the robot/CGA 3. The process of step S1 corresponds to the process of the approach determination function 246.

Figure 8:
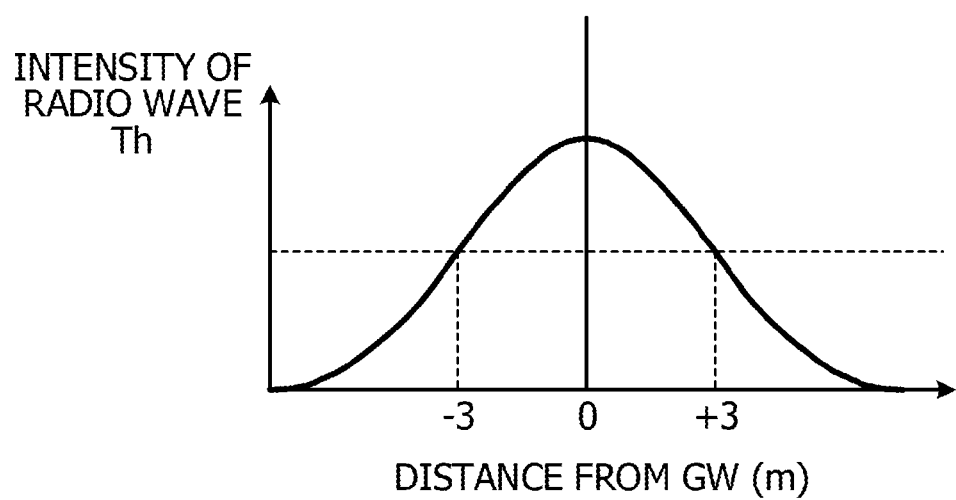
FIG. 8 is a diagram for describing an example of determination of an intensity of a received radio wave.

FIG. 8 is a view for describing an example of determination of an intensity of a received radio wave. In FIG. 8, the vertical axis illustrates the intensity of the received radio wave from the sensor beacon 1 in random units, and the horizontal axis illustrates the distance from the GW 2-1. In this example, GW 2-1 is provided at the same position as the robot/CGA 3 for the convenience of description. As illustrated in FIG. 8, if the intensity of the received radio wave from the sensor beacon 1 is equal to or greater than the threshold value Th, it may be determined that the sensor beacon 1 is located at a distance of 3 m or less from the GW 2-1, that is, the robot/CGA 3.

Even when the position of the GW 2-1 and the position of the robot/CGA 3 are different, if the positional relationship between the GW 2-1 and the robot/CGA 3 is known, it is possible to calculate the distance from the robot/CGA 3 of the sensor beacon 1 based on the distance from the sensor beacon 1 to GW 2-1.

In step S2, the CPU 24 of the GW 2-1 specifies the top N1 (for example, 5) sensor beacons 1 having the highest intensities of the received radio waves among the sensor beacons 1 of which the intensities of the received radio waves from the sensor beacons 1 are equal to or greater than the threshold value Th, acquires the user IDs of the N1 visitors registered for the specified sensor beacon 1 by referring to the DB 26, and notifies the robot/CGA 3 thereof. The process of step S2 is to narrow down the visitors who carry the sensor beacon 1 at a distance of 3 m or less from the robot/CGA 3 to the top N1 visitors (for example, 5 people) closest to the robot/CGA 3, which corresponds to the first narrowing-down process. In FIG. 6, the first narrowing-down process ST1 is illustrated surrounded by a broken line. Among the processes of step S2, the process of specifying the top N1 sensor beacons 1 having the highest intensities of the received radio waves corresponds to the process of the radio wave intensity determination function 247. In addition, among the processes of step S2, the process of acquiring the user ID registered for the specified sensor beacon 1 corresponds to the process of the user ID authentication function 248. Furthermore, among the processes of step S2, the process of notifying the acquired user ID to the robot/CGA 3 corresponds to the process of the robot communication function 122.

In step S3, the CPU 34 of the robot/CGA 3 receives the notification of the user IDs acquired from the GW 2-1 and refers to the DB 32 to instruct an operation of the sensor beacon 1 for the N1 visitors with the user IDs by the audio output. For example, by an audio output such as "Mr. A, Mr. B, Mr. C, Mr. D, Mr. E, please flip over the sensor beacon.", "If you want an explanation, please flip over the sensor beacon.", "Mr. A, Mr. B, Mr. C, Mr. D, Mr. E, please shake the sensor beacon.", the top N1 visitors (for example, 5 people) closest to the robot/CGA 3 are instructed to flip over or shake the sensor beacon 1. Among the processes of step S3, the process of receiving the notification of the user ID acquired from the GW 2-1 corresponds to the process of the GW communication function 131. In addition, among the processes of step S3, the process of instructing the visitor with the user ID to operate the sensor beacon 1 by the audio output by referring to the DB 32 corresponds to the process of the audio output function 132.

In step S4, the CPU 24 of the GW 2-1 changes the radio wave reception frequency to a second radio wave reception frequency Fr2 (Fr2>Fr1) higher than the first radio wave reception frequency Fr1. For example, the first radio wave reception frequency Fr1 is once per second and the second radio wave reception frequency Fr2 is once every 1/10 second. The process of step S4 corresponds to the process of the reception frequency change function 244. It is possible to more reliably detect the sensor beacon 1 that has performed the instructed operation by changing the radio wave reception frequency to the second radio wave reception frequency Fr2.

In step S5, the CPU 24 of the GW 2-1 detects the sensor beacon 1 at which the instructed operation has been performed from the acceleration information and acquires the user ID registered in the DB 26 for the beacon ID of this sensor beacon 1. The process of step S5 corresponds to the second narrowing-down process of narrowing down the top N1 visitors (for example, 5 people) closest to the robot/CGA 3 to the N2 visitors (for example, 3 people) who carry the sensor beacon 1 at which the instructed operation has been performed. In FIG. 6, the second narrowing-down process ST2 is illustrated surrounded by the broken line. It may be determined from the acceleration information from the tri-axial acceleration sensor 11 of the sensor beacon 1 that the sensor beacon 1 has been flipped over or shaken. The process of step S5 corresponds to the process of the person specification function 243.

Figure 9:
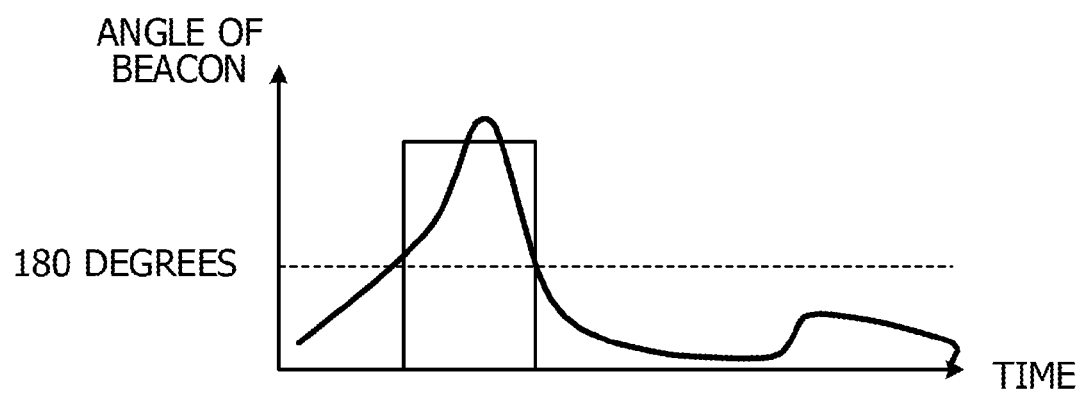
FIG. 9 is a diagram for describing a specific example of a person.

FIG. 9 is a view for describing a specific example of a person. In FIG. 9, the vertical axis represents the angle (attitude) of the sensor beacon 1, and the horizontal axis represents time in random units. When the angle of the sensor beacon 1 changes by, for example, 180 degrees or more due to a change in the acceleration information of the sensor beacon 1 as indicated by the thick solid line in FIG. 9, for example, it may be determined that the sensor beacon 1 is flipped over. In FIG. 9, the thin solid line indicates a digital value of the acceleration information.

In step S6, the CPU 24 of the GW 2-1 determines whether or not the sensor beacon 1 at which the instructed operation has been performed is detected. The process of step S6 corresponds to the process of the person specification function 243.

If the determination result in step S6 is YES, in step S7, the CPU 24 of the GW 2-1 measures the time until the instructed operation is performed, acquires one sensor beacon 1 at which the instructed operation has been performed the earliest, and acquires the user ID of one specified visitor registered in the DB 26 for this one sensor beacon 1. In addition, in step S7, the acquired user ID is notified to the robot/CGA 3. The process of step S7 corresponds to the third narrowing-down process of narrowing down the N2 visitors carrying the sensor beacon 1 at which the instructed operation has been performed to one visitor carrying the sensor beacon 1 at which the instructed operation has been performed the earliest. In FIG. 6, the third narrowing-down process ST3 is illustrated surrounded by the broken line. Among the processes of step S7, the process of acquiring one sensor beacon 1 at which the instructed operation has been performed the earliest corresponds to the process of the operation time measurement function 245. In addition, among the processes of step S7, the process of notifying the acquired user ID to the robot/CGA 3 corresponds to the process of the robot communication function 122.

Figure 10:
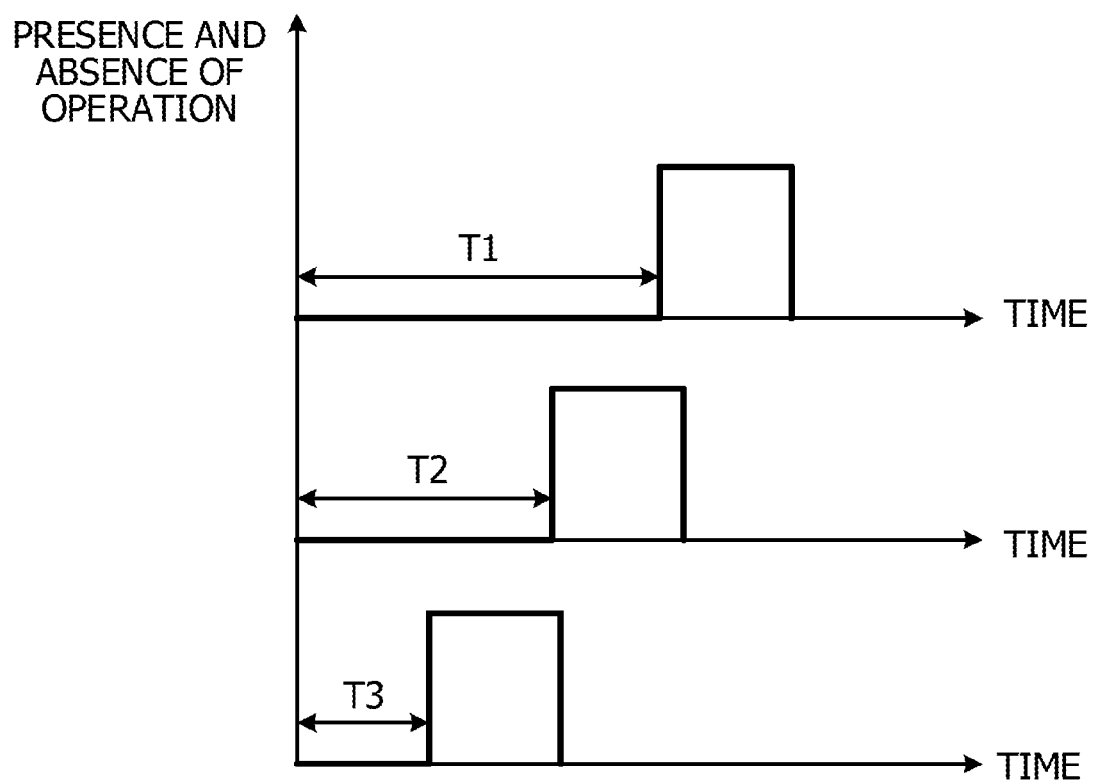
FIG. 10 is a diagram for describing an example of time measurement.

FIG. 10 is a view for describing an example of time measurement. In FIG. 10, the vertical axis indicates the presence or absence of operation of the sensor beacon 1 (that is, the presence or absence of a change of, for example, 180 degrees or more of the angle of the sensor beacon 1), and the horizontal axis indicates time in random units. In this example, the sensor beacon 1 carried by Mr. A is flipped over at time T3 from the instruction to flip over the sensor beacon 1 to the N2 visitors, the sensor beacon 1 carried by Mr. B is flipped over at time T2, the sensor beacon 1 carried by Mr. C is flipped over at time T1, and T3<T2<T1.

In step S8, the CPU 34 of the robot/CGA 3 receives the notification of specified user IDs and refers to the DB 32 to instruct the visitors with the specified user IDs to contact with the magnet 38 of the robot/CGA 3 by an audio output. For example, it is possible to instruct to contact with the magnet 38 by an audio output such as "Mr. A, please touch the magnet" including a name A of one visitor with the specified user ID. In addition, in step S8, the GW 2-1 of the CPU 24 detects from the geomagnetic information from the geomagnetic sensor 12 of the sensor beacon 1 that the sensor beacon 1 is in contact with the magnet 38, that is, that the magnet 38 has been touched. Among the processes of step S8, the process of receiving the notification of the specified user IDs corresponds to the process of the GW communication function 131. Among the processes of step S8, the process of instructing one visitor with a specified user ID to contact with the magnet 38 by the audio output by referring to the DB 32 corresponds to the process of the audio output function 132. Among the processes of step S8, the process of detecting that the sensor beacon 1 is in contact with the magnet 38 corresponds to the process of the beacon reception function 121 for receiving pieces of sensor information from the sensor beacon 1 and the process of the contact determination function 250 for determining that the sensor beacon 1 is in contact with the magnet 38 when the geomagnetic information included in the pieces of the sensor information exceeds, for example, a threshold value th.

Even when the sensor beacon 1 approaches within a certain distance from the guide position of the robot/CGA 3, that is, the position of the magnet 38, it may be determined that the sensor beacon 1 and the magnet 38 are substantially in contact with each other. In addition, for example, in a case where the magnet 38 is provided on the arm 3A-2 of the robot 3, it is also possible to detect that the sensor beacon 1 has approached the guide position of the robot 3 by requesting to shake a hand with the sensor beacon 1 carried by the visitor by the audio output. In this case, since it is possible to detect from the geomagnetic information from the geomagnetic sensor 12 of the sensor beacon 1 that the visitor approaches the robot 3, furthermore, it is possible to detect the motion of the hand-shaking of the visitor from the frequency of the acceleration information from the triaxial acceleration sensor 11 of the sensor beacon 1, it may be determined that the visitor is at the guide position where the visitor may shake a hand with the robot 3.

In step S9, in a case where it is determined that the sensor beacon 1 is in contact with or substantially in contact with the magnet 38, the CPU 24 of the GW 2-1 estimates that one visitor with the specified user ID is at the guide position in front of the magnet 38 of the robot/CGA 3 and notifies the robot/CGA 3 of the position estimation result. In addition, in step S9, the CPU 34 of the robot/CGA 3 receives the notification of the position estimation result and refers to the DB 32 to perform an audio guide, an audio instruction, an audio response, and the like specialized for one visitor with the specified user ID by the audio output and end the process. Among the processes of step S9, the process of estimating that one visitor with the specified user ID is at the guide position in front of the magnet 38 of the robot/CGA 3 corresponds to the process of the position estimation function 251, and the process of notifying the estimation result to the robot/CGA 3 corresponds to the process of the robot communication function 122. In addition, among the processes of step S9, the process of receiving the notification of the position estimation result corresponds to the process of the GW communication function 131, and the process of performing an audio guide, an audio instruction, an audio response, and the like specialized for one visitor with the specified user ID by the audio output by referring to the DB 32 corresponds to the process of the audio output function 132.

In FIG. 6, the estimation process ST11 of estimating that the visitor is at a guide position P1 in front of the magnet 38 of the robot/CGA 3 by determining that the sensor beacon 1 is in contact with or substantially in contact with the magnet 38 based on the geomagnetic information from the geomagnetic sensor 12 of the sensor beacon 1, is illustrated surrounded by the broken line. Furthermore, the estimation process ST12 of estimating that the visitor is at the guide position P1 in front of the magnet 38 of the robot 3 by detecting the motion of the hand-shaking between the visitor and the robot 3 based on the frequency of the acceleration information from the triaxial acceleration sensor 11 of the sensor beacon 1, is illustrated surrounded by the broken line.

Figure 11:
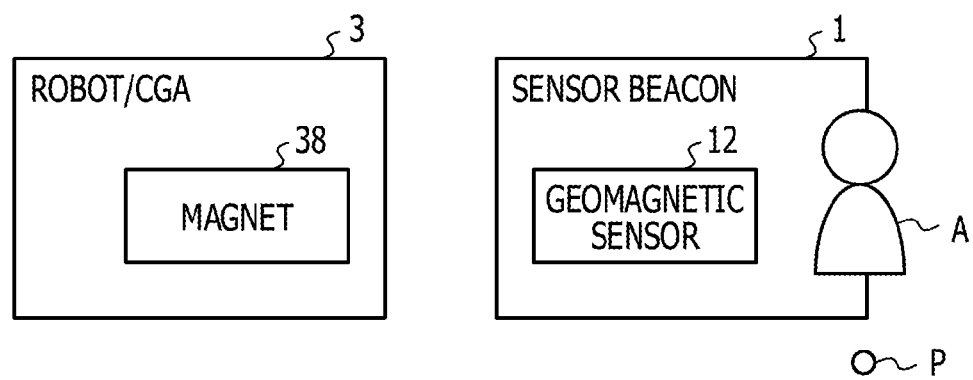
FIG. 11 is a diagram for describing an example of position estimation.

FIG. 11 is a view for describing an example of position estimation. As illustrated in FIG. 11, when the sensor beacon 1 approaches or is in contact with the magnet 38 of the robot/CGA 3, since the geomagnetic information from the geomagnetic sensor 12 of the sensor beacon 1 exceeds the threshold value Th, for example, it is possible to estimate that the visitor Mr. A is at the guide position P1 in front of the magnet 38 of the robot/CGA 3.

On the other hand, if the determination result in the step S6 is NO, the process returns to the step S2. In this case, the process executed in step S2 is to narrow down the visitors who carries the sensor beacon 1 at a distance of 3 m or less from the robot/CGA 3 to the top N1 visitors (for example, 5 people) next closest to the robot/CGA 3, which corresponds to a fourth narrowing-down process. In FIG. 6, the fourth narrowing-down process ST4 is illustrated surrounded by the broken line.

After the process of step S9, the process may return to step S1. However, in this case, the user ID of one visitor specified by the third narrowing-down process in step S7 is excluded from the subsequent narrowing-down processes (that is, the first to third narrowing-down processes). In this way, the same guide and like are not repeated for the same visitor.

When performing an audio output, the CPU 34 of the robot/CGA 3 may control the driving unit 35 so that the robot/CGA 3 performs the operation corresponding to the audio output by referring to the DB 32. The driving unit 35 drives the motors 36A, 36B, and 36C according to the operation patterns, and therefore it is possible to appeal to a visitor who wants to listen to the audio output with gestures of robot/CGA 3, or to match the viewpoint of robot/CGA 3 with one specified visitor, for example.

FIG. 12 is a view for describing an example of a data-base. The data-base illustrated in FIG. 12 corresponds to, for example, DB 26 in the GW 2-1 illustrated in FIG. 1. In the data-base, user information and sensor information are stored. The user information includes a user ID which is an example of identification information for identifying individual users and a name of a user (in this example, a visitor). The name of the user may be used, for example, to call a visitor's name so as to attract a specific visitor's attention from the robot/CGA 3. The sensor information includes a beacon ID, acceleration information, and geomagnetic information, which are examples of identification information for identifying individual sensor beacons 1. In this example, the beacon ID is the media access control (MAC) address of the BLE. The acceleration information is, for example, data indicating that the sensor beacon 1 is flipped over. The geomagnetic information is, for example, data indicating that the sensor beacon 1 is in contact with or substantially in contact with the magnet 38 of the robot/CGA 3. In this example, consecutive numbers No. 1, No. 2, . . . are attached to each pair of user information and sensor information.

According to the present example, it is possible to efficiently provide the service provided by the service providing unit to the visitor who wants to receive the service.

Second Example

Figure 13:
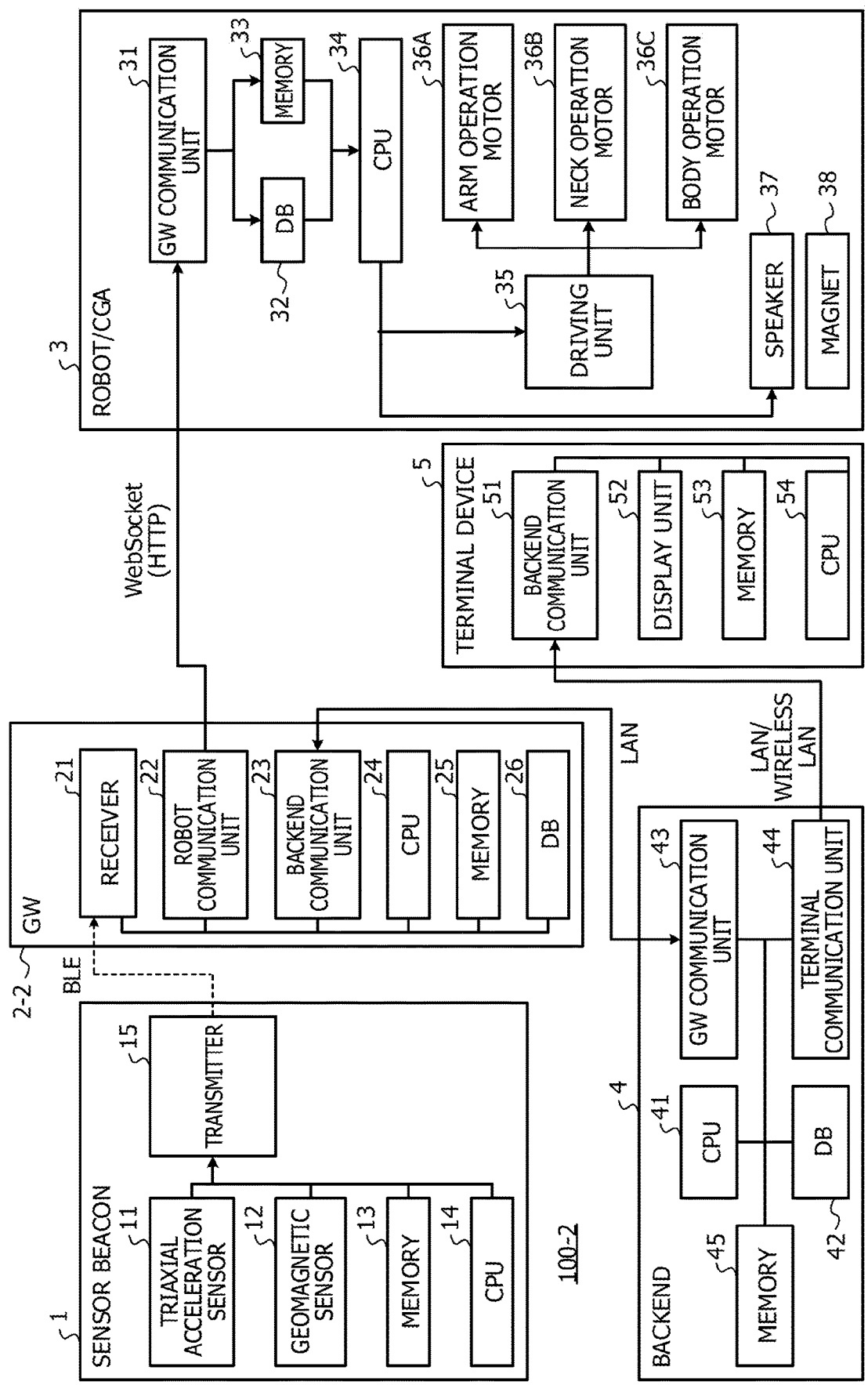
FIG. 13 is a block diagram illustrating an example of a hardware configuration of a system in a second example.

FIG. 13 is a block diagram illustrating an example of a hardware configuration of a system in the second example.

In FIG. 13, the same parts as those in FIG. 1 are denoted by the same reference numerals, and description thereof is omitted. The system 100-2 illustrated in FIG. 13 includes the sensor beacon 1, the GW 2-2, the robot/CGA 3, the backend 4, and the terminal device 5. This system 100-2 is also applied to, for example, an exhibition hall as with the first example. Therefore, the GW 2-2 and the robot/CGA 3 are provided in the exhibition hall and may be provided at the same position. The robot/CGA 3 is provided in, for example, one exhibition booth in the exhibition hall. The backend 4 may be provided in the exhibition hall or outside the exhibition hall, or at least a part thereof may be provided inside or outside the exhibition hall.

The GW 2-2 further includes a backend communication unit 23. The backend communication unit 23 communicates with the backend 4 via a local area network (LAN) under the control of the CPU 24.

The backend 4 executes a part of the operation of the GW 2-1 in the first example instead of the GW 2-2. The backend 4 includes a CPU 41, a DB 42, a GW communication unit 43, a terminal communication unit 44, and a memory 45. The CPU 41 is an example of a processor that controls the operation of the entire backend 4. The CPU 41 calculates the angle (or attitude) of the sensor beacon 1 based on the acceleration information from the sensor beacon 1, determines whether magnetism of the magnet 38 of the robot/CGA 3 is detected or not based on the geomagnetic information from the sensor beacon 1, updates various data, creates a recommended movement route in the exhibition hall, and displays information on the exhibition hall, and the like. The DB 42 stores, for example, a user ID, a beacon ID, a number of approvals, a flow line of the robot/CGA 3, a robot correspondence history, and the like. The DB 42 may include the data-base illustrated in FIG. 12. The GW communication unit 43 communicates with the GW 2-2, for example, via the LAN under the control of the CPU 41. The terminal communication unit 44 communicates with the terminal device 5 via, for example, a LAN or a wireless LAN under the control of the CPU 41. The memory 45 may store programs executed by the CPU 41 and the like.

The backend 4 may communicate with the GW 2-2 and may be formed by a cloud computing system. In this case, the function of the CPU 41 may be executed by a plurality of processors forming the cloud computing system, and the DB 42 may be formed by a plurality of memories in the cloud computing system. For example, the functions of the GW communication unit 43 and the terminal communication unit 44 may be executed by one computer forming the cloud computing system.

The GW 2-2 and the backend 4 form an example of a communication control apparatus.

The terminal device 5 may be formed by, for example, a personal computer (PC) such as a laptop computer, a tablet, a smartphone, or the like. In this example, the terminal device 5 is a portable device and is carried by the visitor. The terminal device 5 includes a backend communication unit 51, a display unit 52, a memory 53, and a CPU 54. The CPU 54 is an example of a processor that controls the operation of the entire terminal device 5. The backend communication unit 51 communicates with the backend 4 via the LAN or the wireless LAN under the control of the CPU 54. Under the control of the CPU 54, the display unit 52 displays a web screen and the like relating to the environment of the system 100-2 in which the sensor beacon 1 is used, which is related to the exhibition hall. The display unit 52 may be formed by a touch panel having an input function. The memory 53 may store programs executed by the CPU 54 and the like.

Figure 14:
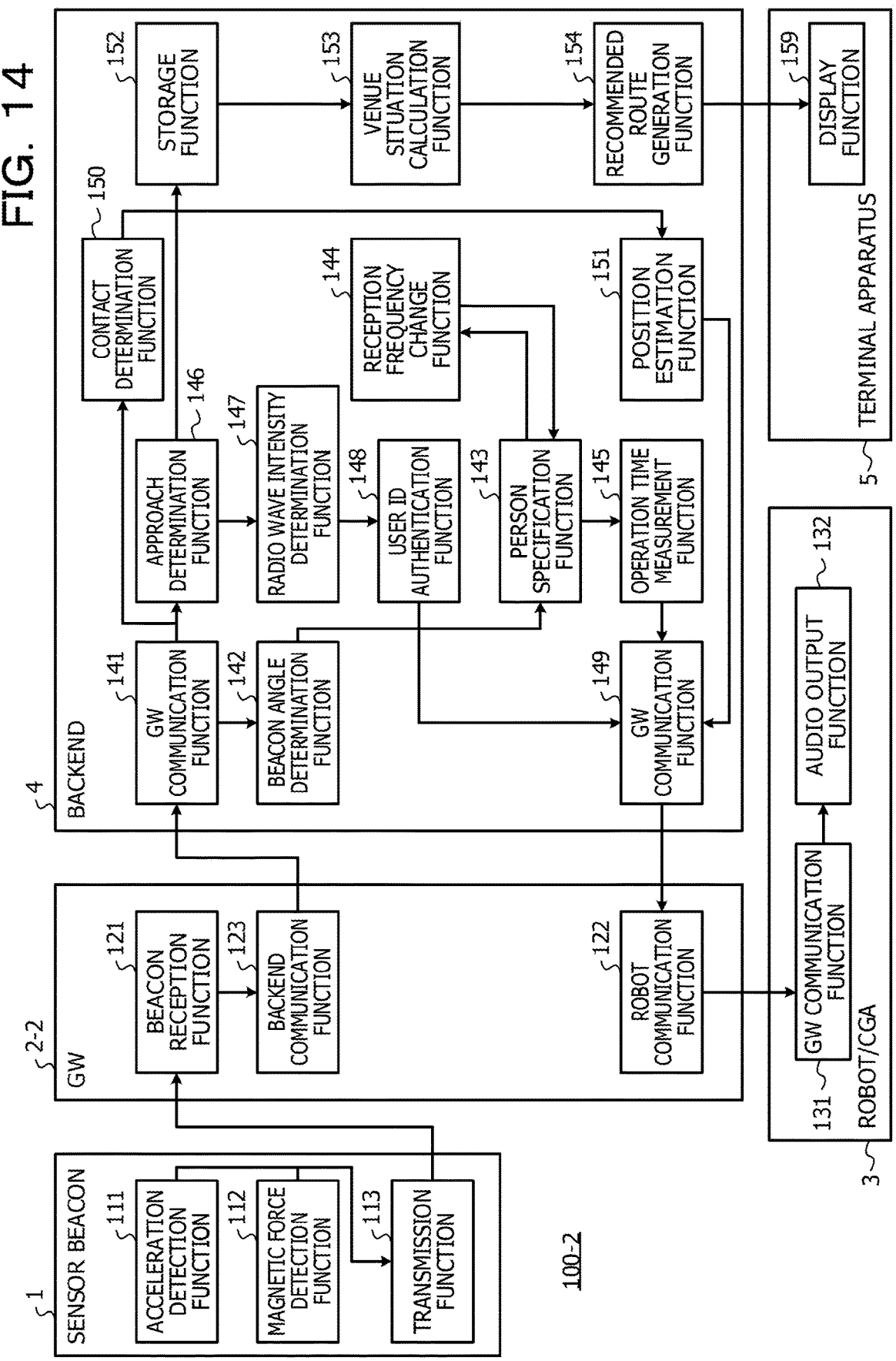
FIG. 14 is a functional block diagram illustrating an example of a functional configuration of the system in the second example.

FIG. 14 is a functional view illustrating an example of a functional configuration of the system in the first example. In FIG. 14, the same parts as those in FIG. 4 are denoted by the same reference numerals, and description thereof is omitted. In the system 100-2 illustrated in FIG. 14, the GW 2-2 has a beacon reception function 121, a robot communication function 122, and a backend communication function 123. The backend communication function 123 is a function of the CPU 24 that communicates with the backend 4 via the backend communication unit 23.

The terminal device 5 has a display function 159. The display function 159 is a function of the CPU 54 that displays a web screen or the like on the display unit 52.

The backend 4 includes a GW communication function 141, a beacon angle determination function 142, a person specification function 143, a reception frequency change function 144, an operation time measurement function 145, an approach determination function 146, a radio wave intensity determination function 147, a user ID authentication function 148, a GW communication function 149, a contact determination function 150, a position estimation function 151, a storage function 152, a venue situation calculation function 153, and a recommended route creation function 154.

The GW communication function 141 is a function of the CPU 41 that communicates with the GW 2-2 via the GW communication unit 43 and receives pieces of sensor information from the sensor beacon 1. The beacon angle determination function 142 is a function of the CPU 41 that determines the angle (or attitude) of the sensor beacon 1 based on the acceleration information among the pieces of the sensor information from the sensor beacon 1 received by the GW communication unit 43 via the GW 2-2. The person specification function 143 is a function of the CPU 41 that specifies N2 (N2≤N1) visitors who have operated (for example, flipped over or shaken) the sensor beacon 1 by referring to the DB 42 based on the acceleration information and the beacon ID among the pieces of the sensor information from the sensor beacon 1 received by the GW communication unit 43 via the GW 2-2. The reception frequency change function 144 is a function of the CPU 41 that changes the direction in which the receiver 21 of the GW 2-2 receives the pieces of the sensor information from the sensor beacon 1 in a direction to increase the frequency. The operation time measurement function 145 is a function of the CPU 41 that measures the operation time of one visitor who has operated the sensor beacon 1 the earliest among the visitors who have operated the sensor beacon 1.

When the intensity of the received radio wave (that is, intensity of received signal) at which the GW 2-2 receives the pieces of the sensor information from the sensor beacon 1, which is received by the GW communication unit 43 via the GW 2-2, is equal to or greater than the threshold value Th, the approach determination function 146 is a function of the CPU 41 that determines that a visitor carrying the sensor beacon 1 approaches a distance of, for example, 3 m or less from the robot/CGA 3 by referring to the DB 42. The radio wave intensity determination function 147 is a function of the CPU 41 that determines the top N1 (for example, 5) sensor beacons 1 having the highest intensities of the received radio waves among the sensor beacons 1 transmitting the pieces of the sensor information of which the intensities of the received radio waves are equal to or greater than the threshold value Th. The radio wave intensity determination function 147 may specify the N1 visitors (for example, 5 people) who have approached the robot/CGA 3 most. By referring to the DB 42, the user ID authentication function 148 is a function of the CPU 41 that authenticates the user IDs of the top N1 sensor beacons 1 of which the intensities of the received radio waves of the transmitting pieces of sensor information are equal to or greater than the threshold value Th. The GW communication function 149 is a function of the CPU 41 that communicates with the GW 2-2 via the GW communication unit 43.

The contact determination function 150 is a function of the CPU 41 that determines whether or not the sensor beacon 1 is in contact with the magnet 38 of the robot/CGA 3 (or whether or not the sensor beacon 1 is substantially in contact with the magnet) based on the geomagnetic information among the pieces of the sensor information from the sensor beacon 1 received by the GW communication unit 43 via the GW 2-2. The position estimation function 151 is a function of the CPU 41 that determines that one visitor carrying the sensor beacon 1 is at the guide position corresponding to the position of the magnet 38 of the robot/CGA 3 by referring to the DB 42 when the contact determination function 150 determines the sensor beacon 1 is in contact with the magnet 38 of the robot/CGA 3. The storage function 152 is a function of the CPU 41 that stores the user ID, the flow line of the robot/CGA 3, the robot correspondence history, the congestion information in the exhibition hall, and the like received by the GW communication unit 43 via the GW 2-2 in the DB 42. The venue situation calculation function 153 is a function of the CPU 41 that calculates the congestion situation in the exhibition hall based on the information stored in the DB 42. The recommended route creation function 154 is a function of the CPU 41 that creates guide information such as a recommended route for the visitor with the specified user ID and communicates with the terminal device 5 via the terminal communication unit 44. In this way, it is possible to provide the terminal device 5 with guide information such as a recommended route to the visitor with the specified user ID and display the guide information on the terminal device 5.

Figure 15:
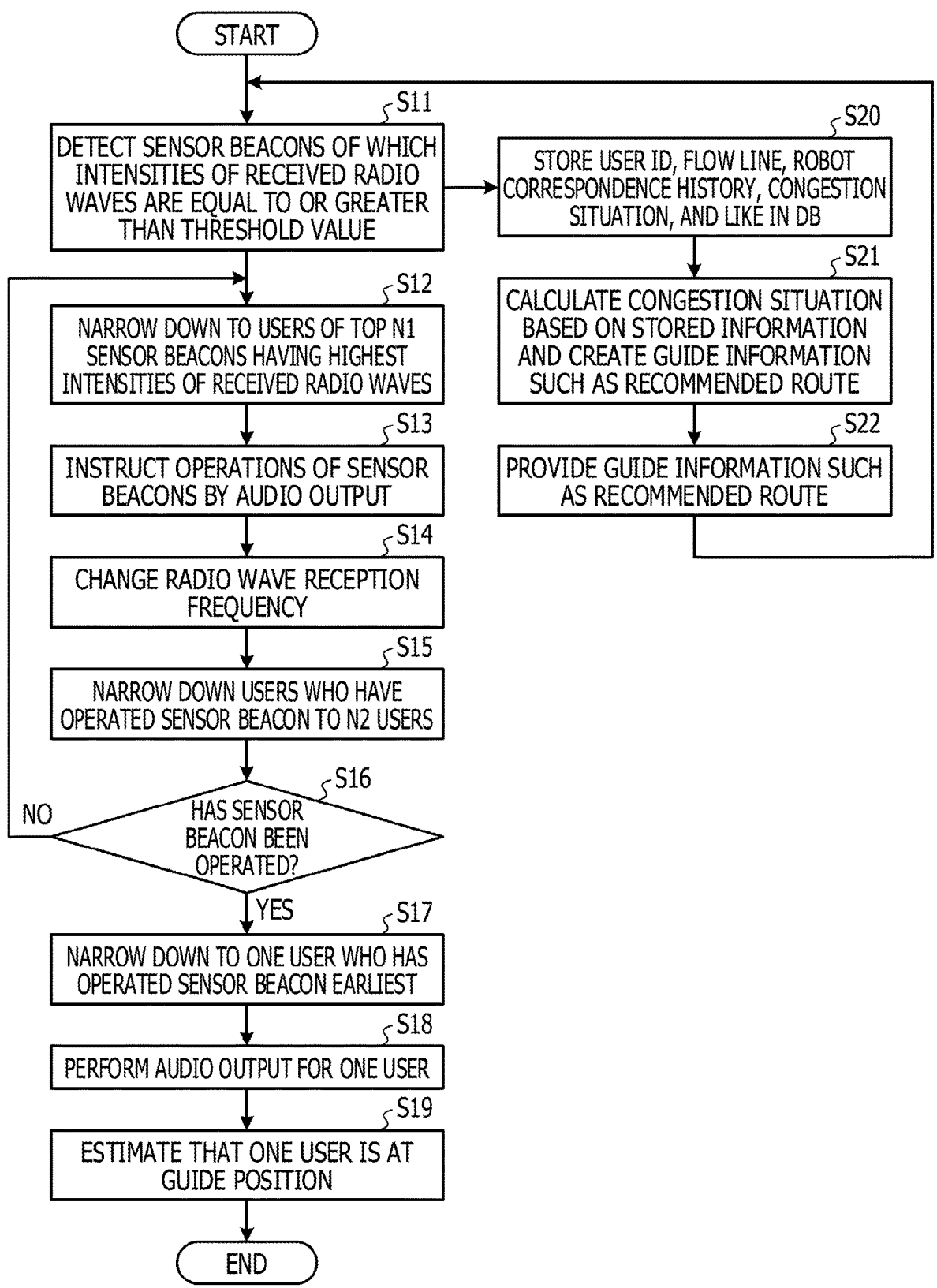
FIG. 15 is a flowchart for describing an example of a process of the system in the second example.

FIG. 15 is a flowchart for describing an example of the process of the system in the second example. In FIG. 15, in step S11, the CPU 41 of the backend 4 detects the sensor beacon 1 within a range where it is likely to respond to the audio output from the robot/CGA 3, for example, the distance from the robot/CGA 3 is a radius of 3 m or less. Among the plurality of sensor beacons 1, the intensity of the received radio wave (that is, the intensity of received signal) from the sensor beacon 1 whose distance from the robot/CGA 3 is, for example, a radius of 3 m or less, is equal to or greater than the threshold value Th. Therefore, if the intensity of the received radio wave received from the sensor beacon 1 received at the first radio wave reception frequency Fr1 is equal to or greater than the threshold value Th, it may be determined that the sensor beacon 1 is located at a distance of 3 m or less from the robot/CGA 3. The process of step S11 corresponds to the process of the approach determination function 146.

In step S12, the CPU 41 of the backend 4 specifies the top N1 (for example, 5) sensor beacons 1 having the highest intensities of the received radio waves among the sensor beacons 1 of which the intensities of the received radio waves from the sensor beacons 1 are equal to or greater than the threshold value Th, acquires the user IDs of the N1 visitors registered for the specified sensor beacon 1 by referring to the DB 42, and notifies the robot/CGA 3 thereof. The process of step S12 is to narrow down the visitors who carry the sensor beacon 1 at a distance of 3 m or less from the robot/CGA 3 to the top N1 visitors (for example, 5 people) closest to the robot/CGA 3, which corresponds to the first narrowing-down process. Among the processes of step S12, the process of specifying the top N1 sensor beacons 1 having the highest intensities of the received radio waves corresponds to the process of the radio wave intensity determination function 147. In addition, among the processes of step S12, the process of acquiring the user ID registered for the specified sensor beacon 1 corresponds to the process of the user ID authentication function 148. Furthermore, among the process of step S12, the process of notifying the acquired user ID to the robot/CGA 3 via the GW 2-2 corresponds to the process of the GW communication function 149.

In step S13, the CPU 34 of the robot/CGA 3 receives the notification of the user IDs acquired from the GW 2-2 and refers to the DB 32 to instruct an operation of the sensor beacon 1 for the N1 visitors with the user IDs by the audio output. For example, by an audio output such as "Mr. A, Mr. B, Mr. C, Mr. D, Mr. E, please flip over the sensor beacon.", "If you want an explanation, please flip over the sensor beacon.", "Mr. A, Mr. B, Mr. C, Mr. D, Mr. E, please shake the sensor beacon.", the top N1 visitors (for example, 5 people) closest to the robot/CGA 3 are instructed to flip over or shake the sensor beacon 1. Among the processes of step S13, the process of receiving the notification of the user ID acquired from the GW 2-2 corresponds to the process of the GW communication function 131. In addition, among the processes of step S13, the process of instructing the visitor with the user ID to operate the sensor beacon 1 by the audio output by referring to the DB 32 corresponds to the process of the audio output function 132.

In step S14, the CPU 41 of the backend 4 changes the radio wave reception frequency to the second radio wave reception frequency Fr2 (Fr2>Fr1) higher than the first radio wave reception frequency Fr1. For example, the first radio wave reception frequency Fr1 is once per second and the second radio wave reception frequency Fr2 is once every $\frac{1}{10}$ second. The process of step S14 corresponds to the process of the reception frequency change function 144.

In step S15, the CPU 41 of the backend 4 detects the sensor beacon 1 at which the instructed operation has been performed from the acceleration information and acquires the user ID registered in the DB 42 for the beacon ID of this sensor beacon 1. The process of step S15 corresponds to the second narrowing-down process of narrowing down visitors of the top N1 visitors (for example, 5 people) closest to the robot/CGA 3 to the N2 visitors (for example, 3 people) who carry the sensor beacon 1 at which the instructed operation has been performed. It may be determined from the acceleration information from the triaxial acceleration sensor 11 of the sensor beacon 1 that the sensor beacon 1 has been flipped over or shaken. The process of step S15 corresponds to the process of the person specification function 143.

In step S16, the CPU 41 of the backend 4 determines whether or not the sensor beacon 1 at which the instructed operation has been performed has been detected. The process of step S16 corresponds to the process of the person specification function 143.

If the determination result in step S16 is YES, in step S17, the CPU 41 of the backend 4 measures the time until the instructed operation is performed, acquires one sensor beacon 1 at which the instructed operation has been performed the earliest, and acquires the user ID of one specified visitor registered in the DB 42 for this one sensor beacon 1. In addition, in step S17, the acquired user ID is notified to the robot/CGA 3. The process of step S17 corresponds to the third narrowing-down process of narrowing down the N2 visitors carrying the sensor beacon 1 at which the instructed operation has been performed to one visitor carrying the sensor beacon 1 at which the instructed operation has been performed the earliest. Among the processes of step S17, the process of acquiring one sensor beacon 1 at which the instructed operation has been performed the earliest corresponds to the process of the operation time measurement function 145. In addition, among the processes of step S17, the process of notifying the acquired user ID to the robot/CGA 3 corresponds to the process of the GW communication function 149.

In step S18, the CPU 34 of the robot/CGA 3 receives the notification of specified user IDs and refers to the DB 32 to instruct the visitors with the specified user IDs to contact with the magnet 38 of the robot/CGA 3 by an audio output. For example, it is possible to instruct to contact with the magnet 38 by an audio output such as "Mr. A, please touch the magnet" including a name A of one visitor with the specified user ID. In addition, in step S18, the CPU 41 of the backend 4 detects from the geomagnetic information from the geomagnetic sensor 12 of the sensor beacon 1 that the sensor beacon 1 is in contact with the magnet 38, that is, that the magnet 38 has been touched. Among the processes of step S18, the process of receiving the notification of the specified user ID corresponds to the process of the GW communication function 131. Among the processes of step S18, the process of referring to the DB 32 and instructing one visitor with the specified user ID to contact with the magnet 38 by the audio output corresponds to the process of the audio output function 132. Among the processes of step S18, the process of detecting that the sensor beacon 1 is in contact with the magnet 38 corresponds to the process of the beacon reception function 121 for receiving pieces of sensor information from the sensor beacon 1 and the process of the contact determination function 150 for determining that the sensor beacon 1 is in contact with the magnet 38 when the geomagnetic information included in the sensor information exceeds, for example, the threshold value th.

Even when the sensor beacon 1 approaches within a certain distance from the guide position of the robot/CGA 3, that is, the position of the magnet 38, it may be determined that the sensor beacon 1 and the magnet 38 are substantially in contact with each other. In addition, for example, in a case where the magnet 38 is provided on the arm 3A-2 of the robot 3, it is also possible to detect that the sensor beacon 1 has approached the guide position of the robot 3 by requesting to shake a hand with the sensor beacon 1 carried by the visitor by the audio output. In this case, since it is possible to detect from the geomagnetic information from the geomagnetic sensor 12 of the sensor beacon 1 that the visitor approaches the robot 3, furthermore, it is possible to detect the motion of the hand-shaking of the visitor from the frequency of the acceleration information from the triaxial acceleration sensor 11 of the sensor beacon 1, it may be determined that the visitor is at the guide position where the visitor may shake a hand with the robot 3.

In step S19, in a case where it is determined that the sensor beacon 1 is in contact with or substantially in contact with the magnet 38, the CPU 41 of the backend 4 estimates that one visitor with the specified user ID is at the guide position in front of the magnet 38 of the robot/CGA 3 and notifies the robot/CGA 3 of the position estimation result via the GW 2-2. In addition, in step S19, the CPU 34 of the robot/CGA 3 receives the notification of the position estimation result and refers to the DB 32 to perform an audio guide, an audio instruction, an audio response, and the like specialized for one visitor with the specified user ID by the audio output and end the process. Among the processes of step S19, the process of estimating that one visitor with the specified user ID is at the guide position in front of the magnet 38 of the robot/CGA 3 corresponds to the process of the position estimation function 151, and the process of notifying the estimation result to the robot/CGA 3 via the GW 2-2 corresponds to the process of the GW communication function 149. In addition, among the processes of step S19, the process of receiving the notification of the position estimation result corresponds to the process of the GW communication function 131, and the process of performing an audio guide, an audio instruction, an audio response, and the like specialized for one visitor with the specified user ID by the audio output by referring to the DB 32 corresponds to the process of the audio output function 132.

On the other hand, if the determination result in the step S16 is NO, the process returns to the step S12. In this case, the process executed in step S12 is to narrow down the visitors who carries the sensor beacon 1 at a distance of 3 m or less from the robot/CGA 3 to the top N1 visitors (for example, 5 people) next closest to the robot/CGA 3, which corresponds to the fourth narrowing-down process.

After the process of step S19, the process may return to step S11. However, in this case, the user ID of one visitor specified by the third narrowing-down process in step S17 is excluded from the subsequent narrowing-down processes (that is, the first to third narrowing-down processes). In this way, the same guide and like are not repeated for the same visitor.

When performing an audio output, the CPU 34 of the robot/CGA 3 may control the driving unit 35 so that the robot/CGA 3 performs the operation corresponding to the audio output by referring to the DB 32. The driving unit 35 drives the motors 36A, 36B, and 36C according to the operation patterns, and therefore it is possible to appeal to a visitor who wants to listen to the audio output with gestures of robot/CGA 3, or to match the viewpoint of robot/CGA 3 with one specified visitor, for example.

On the other hand, after step S11, in step S20, the CPU 41 of the backend 4 stores the user ID acquired via the GW 2-2, the flow line of the robot/CGA 3, the robot correspondence history, congestion information on the exhibition hall, and the like in the DB 42 of the backend 4. The process of step S20 corresponds to the process of the storage function 152.

In step S21, the CPU 41 of the backend 4 calculates the congestion situation in the exhibition hall based on the information stored in the DB 42 and creates guide information such as a recommended route for the visitor with the specified user ID. The process of step S21 corresponds to the process of the venue situation calculation function 153.

In step S22, the CPU 41 of the backend 4 provides the terminal device 5 with guide information such as a recommended route to the visitor with the specified user ID. In addition, in step S22, the CPU 54 of the terminal device 5 receives the guide information such as the recommended route provided from the backend 4 by the backend communication unit 51 and displays the guide information on the display unit 52. Among the processes of step S22, the process of providing the guide information such as the recommended route corresponds to the process of the recommended route creation function 154. In addition, among the processes of step S22, the process of displaying the guide information such as a recommended route on the display unit 52 of the terminal device 5 corresponds to the process of the display function 159. After step S12, the process returns to step S1.

According to the present example, it is possible to efficiently provide the service provided by the service providing unit to the visitor who wants to receive the service. In addition, since more processes may be executed by the backend, it is possible to reduce the load on the GW and to improve the processing speed. Furthermore, since the guide information such as the recommended route may be displayed on the terminal device, it is possible to improve the quality of the service provided to the visitor.

Third Example

FIG. 16 is a block diagram illustrating an example of a hardware configuration of a system in a third example. In FIG. 16, the same parts as those in FIG. 13 are denoted by the same reference numerals, and description thereof is omitted. The system 100-3 illustrated in FIG. 16 includes the sensor beacon 1, the GW 2-3, the robot/CGA 3, the backend 4, the terminal device 5, and the terminal device 6. This system 100-3 is also applied to, for example, an exhibition hall as with the first example. Therefore, the GW 2-3 and the robot/CGA 3 are provided in the exhibition hall and may be provided at the same position. The robot/CGA 3 is provided in, for example, one exhibition booth in the exhibition hall. The backend 4 may be provided in the exhibition hall or outside the exhibition hall, or at least a part thereof may be provided inside or outside the exhibition hall. The terminal device 5 is an example of a first terminal device carried by the visitor. The terminal device 6 is an example of a second terminal device carried by a guide.

The GW 2-3 further includes a terminal communication unit 27. The terminal communication unit 27 communicates with the terminal device 6 via, for example, a LAN or a wireless LAN under the control of the CPU 24. The GW 2-3 and the backend 4 form an example of a communication control apparatus.

The robot/CGA 3 further includes a backend communication unit 39. The backend communication unit 39 communicates with the backend 4 under the control of the CPU 34 via a LAN or a wireless LAN, for example.

The terminal device 6 may be formed by, for example, a PC such as a notebook computer, a tablet, a smartphone, or the like. The terminal device 6 is a portable device in this example. The terminal device 6 includes a GW communication unit 61, a touch panel 62, a memory 63, a CPU 64, a robot communication unit 65, and a backend communication unit 66. The CPU 64 is an example of a processor that controls the operation of the entire terminal device 6. The GW communication unit 61 communicates with the GW 2-3 via a LAN or a wireless LAN under the control of the CPU 64. The touch panel 62 has a display function for displaying images, messages, and the like under the control of the CPU 64, and an input function for inputting instructions from the guide. The memory 63 may store programs executed by the CPU 64 and the like. The robot communication unit 65 communicates with the terminal device 6 via the LAN or the wireless LAN under the control of the CPU 64. The backend communication unit 66 communicates with the backend 4 via the LAN or the wireless LAN under the control of the CPU 64.

Figure 17A:
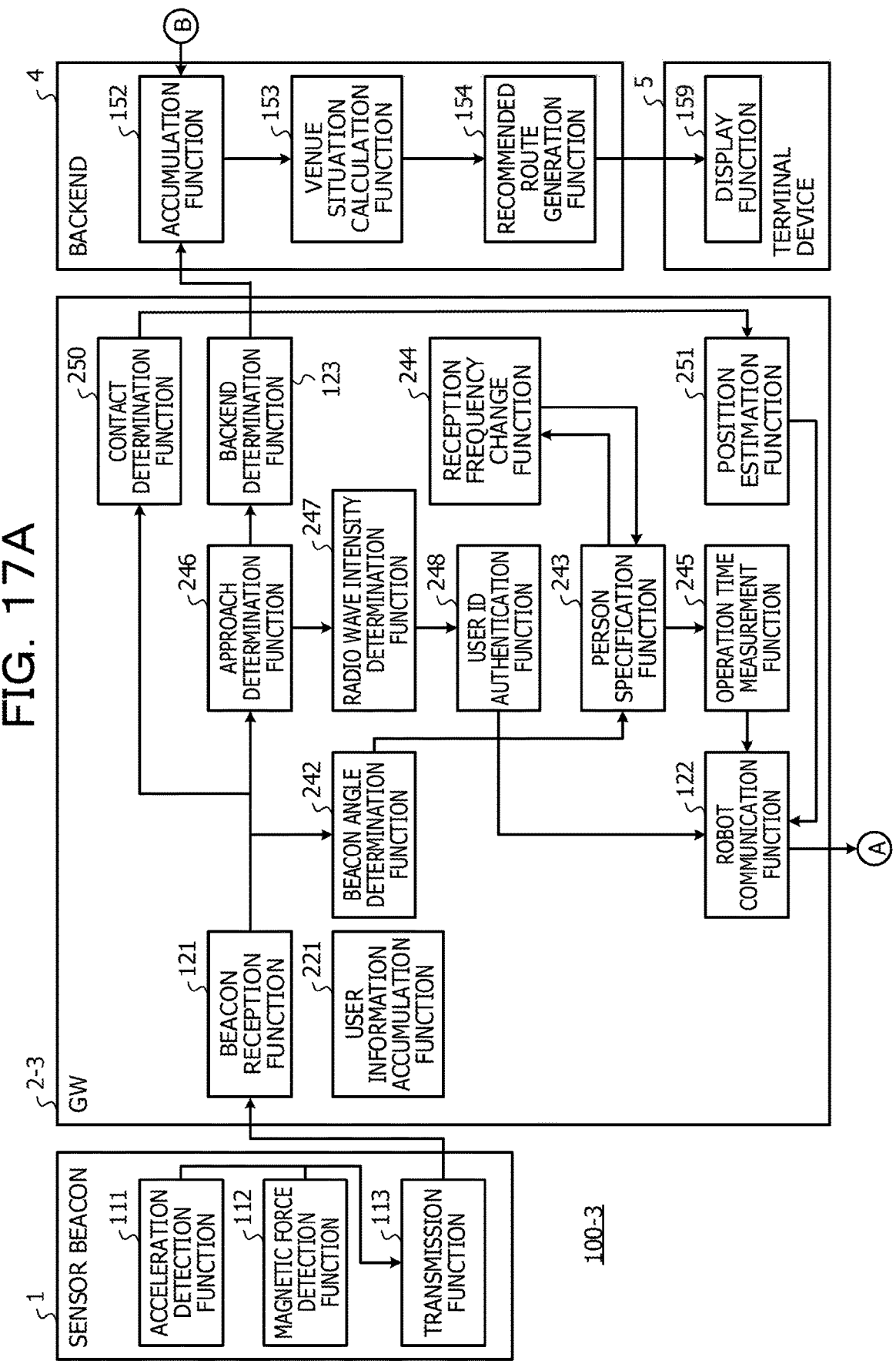
FIGS. 17A and 17B are functional block diagrams illustrating an example of a functional configuration of the system in the third example.
Figure 17B:
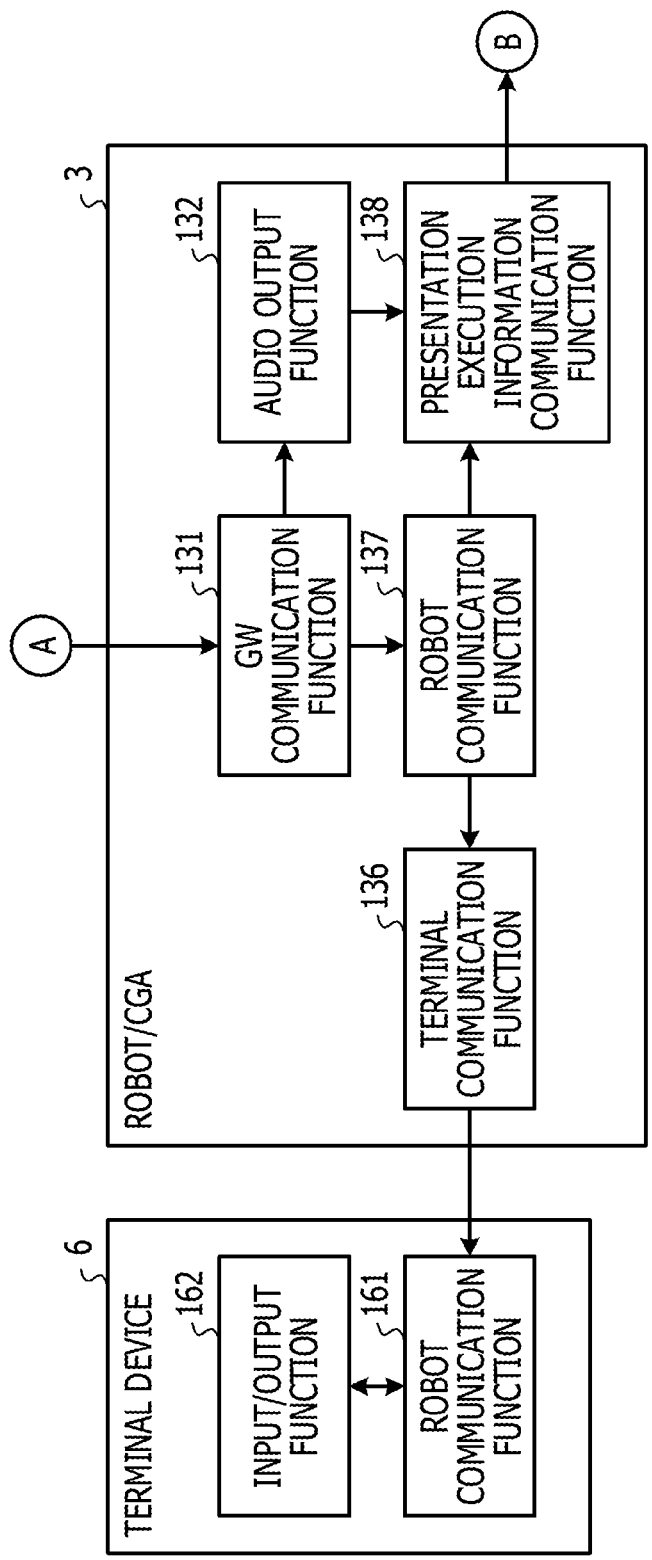

FIGS. 17A and 17B are functional view illustrating an example of a functional configuration of the system in the third example. In FIGS. 17A and 17B, the same parts as those in FIGS. 4 and 14 are denoted by the same reference numerals, and description thereof is omitted. The GW 2-3 has a user information storage function 221. The user information storage function 221 is a function of the CPU 24 that stores user information and the like in the DB 26.

The robot/CGA 3 has a terminal communication function 136, a user information reception function 137, and a presentation execution information communication function 138. The terminal communication function 136 is a function of the CPU 34 that communicates with the terminal device 6. The user information reception function 137 is a function of the CPU 34 that enables the visitor who approaches the robot/CGA 3 to be specified by receiving the user information from the GW 2-3 at the time of registering the visitor at the reception of the exhibition hall, for example. The presentation execution information communication function 138 is a function of the CPU 34 that transmits a robot correspondence history such as which explanation has been provided to which visitor to the backend 4.

In addition, the terminal device 6 has a robot communication function 161 and an input/output function 162. The robot communication function 161 is a function of the CPU 64 that communicates with the robot/CGA 3. The input/output function 162 includes a display function of the CPU 64 that displays images, messages, and the like on the touch panel 62, and an input function of the CPU 64 that inputs instructions from the guide from the touch panel 62.

Figure 18:
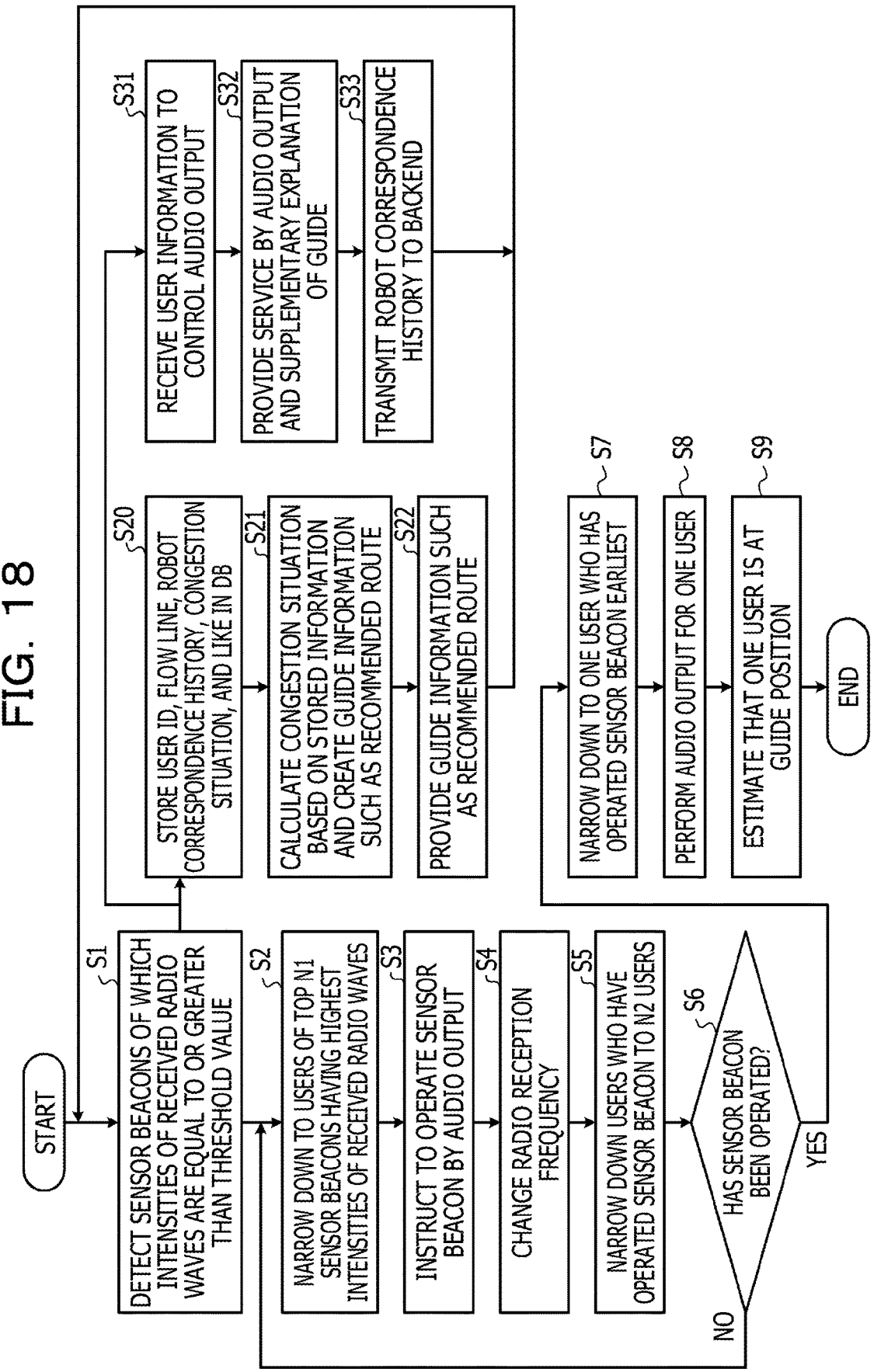
FIG. 18 is a flowchart for describing an example of a process of the system in the third example.

FIG. 18 is a flowchart for describing an example of a process of the system in the third example. In FIG. 18, the same steps as those in FIG. 15 are denoted by the same reference numerals, and description thereof is omitted. In FIG. 18, the process of step S31 is executed in parallel with the process of step S20, for example. In step S31, the CPU 64 of the terminal device 6 receives the user information received from the GW 2-3 by the robot/CGA 3 via the robot communication unit 65. The process of receiving the user information in step S31 corresponds to the process of the robot communication function 161. In addition, in step S31, the CPU 64 of the terminal device 6 may transmit an instruction input from the touch panel 62 by the guide to the robot/CGA 3 via the robot communication unit 65 to control the audio output of the robot/CGA 3 or control the operation of the robot/CGA 3. The process of transmitting an instruction to the robot/CGA 3 in step S31 corresponds to the process of the input/output function 162 and the robot communication function 161. Furthermore, in step S31, the CPU 64 of the terminal device 6 may display information relating to the instruction to the robot/CGA 3 on the touch panel 62. The process of displaying the information relating to the instruction to the robot/CGA 3 in step S31 on the touch panel 62 corresponds to the process of the input/output function 162. The information relating to the instruction to the robot/CGA 3 displayed on the touch panel 62 may include an instruction of interaction such as a dialogue with the robot/CGA 3 to the guide.

In step S32, a service is provided to the visitors by an audio output by the robot/CGA 3 and supplementary explanation by the guide for visitors who carry the sensor beacon 1 whose distance from the robot/CGA 3 detected in step S1 is, for example, a radius of 3 m or less. The guide may use the information displayed on the touch panel 62 of the terminal device 6 for the supplementary explanation to make a supplementary explanation while giving the display content to the visitors, for example. Accordingly, the robot/CGA 3, in this case, may also function as a mediator between the guide and the visitors, and the robot/CGA 3 and the guide may cooperate to provide the service to the visitors. The process of step S32 corresponds to the cooperation process between the process of the audio output function 132 of the robot/CGA 3 and the process (that is, supplementary explanation) of the guide.

In step S33, the CPU 34 of the robot/CGA 3 transmits a robot correspondence history such as which explanation has been provided to which visitor via the backend communication unit 39 to the backend 4. The process of step S33 corresponds to the process of the presentation execution information communication function 138. After step S33, the process returns to step S1. In the backend 4 which has received the robot correspondence history, for example, it is possible to update the service contents and the like to be provided for each visitor by storing and analyzing the robot correspondence history.

According to the present example, it is possible to efficiently provide the service provided by the service providing unit to the visitor who wants to receive the service. In addition, since part of the process may be executed by the backend, it is possible to reduce the load on the GW and to improve the processing speed. Furthermore, since the guide information such as the recommended route may be displayed on the first terminal device, it is possible to improve the quality of the service provided to the visitor. In addition, by giving the second terminal device to the guide and supplementing the explanation of the robot/CGA by the guide, the robot/CGA and the guide may cooperate to provide visitor services.

Modification Example

In a case where the processes within the system are distributed to the GW and the backend, it is possible to randomly select which process to execute with the GW (or backend). The GW is suitable for detecting sensor information (acceleration information, geomagnetic information, beacon ID, and the like) transmitted from the sensor beacon during a processing time of several msec, for example, and detecting an intensity of a received radio wave of the sensor information. In addition, the GW is also suitable for storing user information with processing time of several tens msec, for example. Generally, it is easier to manage the security of user information in the GW than to manage in the backend (that is, cloud computing system). On the other hand, the backend is suitable for performing user ID authentication with a processing time of several hundred msec, for example, and storing robot correspondence history.

Although the disclosed communication control apparatus, method, and system have been described by way of examples, the embodiment is not limited to the above examples, and it goes without saying that various modifications and improvements are possible within the scope of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control apparatus, comprising:
a memory; and
a processor coupled to the memory and the processor configured to execute a process, the process including:
selecting one or more users from users based on intensities of received signals of sensor information transmitted by a plurality of tag devices associated with the users, respectively;
outputting information that instructs an operation for the plurality of tag devices;
detecting the tag device for which the operation has been performed based on acceleration information of the plurality of tag devices;
causing a service provision device to output sound information regarding a service for a specific user associated with the detected tag device;
causing the service provision device to guide the specific user to a position in a vicinity of the service provision device; and
determining whether the specific user is at the position based on geomagnetic sensor information of the detected tag device,
wherein the service corresponds to the position and the specific user, and
the determining determines whether the specific user is at the position further based on the acceleration sensor information of the detected tag device.

2. The communication control apparatus according to claim 1, wherein the information that instructs the operation is sound information.

3. The communication control apparatus according to claim 1, wherein
the detecting detects the detected tag device for which the operation has been performed when the acceleration sensor information of the detected tag device indicates a specific change.

4. The communication control apparatus according to claim 3, wherein
the detecting detects the detected tag device when the specific change of the acceleration sensor information of the detected tag device is detected earliest among the plurality of tag devices.

5. The communication control apparatus according to claim 1, wherein the process further comprises:
increasing a reception frequency of the received signals from the detected tag device after the detecting.

6. The communication control apparatus according to claim 1, wherein the process further comprises:
displaying a web screen relating to an environment in which the detected tag device is used on a display of a first terminal device.

7. The communication control apparatus according to claim 6, wherein the process further comprises:
displaying, on a display of a first terminal device, an instruction of interaction including a dialogue with the service provision device to a guide.

8. A communication control method executed by a computer, the communication control method comprising:
selecting one or more users from users based on intensities of received signals of sensor information transmitted by a plurality of tag devices associated with the users, respectively;
outputting information that instructs an operation for the plurality of tag devices;
detecting the tag device for which the operation has been performed based on acceleration information of the plurality of tag devices;
causing a service provision device to output sound information regarding a service for a specific user associated with the detected tag device;

causing the service provision device to guide the specific user to a position in a vicinity of the service provision device; and determining whether the specific user is at the position based on geomagnetic sensor information of the detected tag device, wherein the service corresponds to the position and the specific user, and the determining determines whether the specific user is at the position further based on the acceleration sensor information of the detected tag device.

9. The communication control method according to claim 8, wherein the information that instructs the operation is sound information.

10. The communication control method according to claim 8, wherein the detecting detects the detected tag device for which the operation has been performed when the acceleration sensor information of the detected tag device indicates a specific change.

11. The communication control method according to claim 10, wherein the detecting detects the detected tag device when the specific change of the acceleration sensor information of the detected tag device is detected earliest among the plurality of tag devices.

12. The communication control method according to claim 8, wherein the service provision device is a robot.

13. The communication control method according to claim 8, wherein the service provision device is a display device that displays a computer graphics agent (CGA).

* * * * *